United States Patent
Roche et al.

(10) Patent No.: US 12,198,450 B2
(45) Date of Patent: *Jan. 14, 2025

(54) SYSTEMS AND METHODS FOR PERFORMING OPERATIONS IN A VEHICLE USING GAZE DETECTION

(71) Applicant: NVIDIA Corporation, Santa Clara, CA (US)

(72) Inventors: Jason Conrad Roche, Santa Clara, CA (US); Niranjan Avadhanam, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/481,770

(22) Filed: Oct. 5, 2023

(65) Prior Publication Data

US 2024/0037964 A1 Feb. 1, 2024

Related U.S. Application Data

(63) Continuation of application No. 16/859,741, filed on Apr. 27, 2020, now Pat. No. 11,790,669.

(51) Int. Cl.
*G06T 7/00* (2017.01)
*G06F 3/01* (2006.01)
(Continued)

(52) U.S. Cl.
CPC ............ *G06V 20/597* (2022.01); *G06F 3/013* (2013.01); *G06N 3/02* (2013.01); *G06N 20/00* (2019.01)

(58) Field of Classification Search
CPC ........ G06V 10/82; G06V 10/26; G06V 10/44; G06V 10/774; G06V 20/70; G06V 10/764;
(Continued)

(56) References Cited

U.S. PATENT DOCUMENTS 10,885,698 B2  1/2021  Muthler et al.
11,790,669 B2 * 10/2023 Roche .................... B60K 35/10
                                                 382/100
(Continued)

FOREIGN PATENT DOCUMENTS

CN       110211586 A     9/2019
WO    2020225556 A1    11/2020

OTHER PUBLICATIONS

Roche, Jason; Non-Final Office Action for U.S. Appl. No. 16/859,741, filed Apr. 27, 2020, mailed Aug. 31, 2022, 18 pgs.
(Continued)

*Primary Examiner* — Quan M Hua
(74) *Attorney, Agent, or Firm* — Taylor English Duma L.L.P.

(57) ABSTRACT

In various examples, systems and methods are disclosed herein for a vehicle command operation system that may use technology across multiple modalities to cause vehicular operations to be performed in response to determining a focal point based on a gaze of an occupant. The system may utilize sensors to receive first data indicative of an eye gaze of an occupant of the vehicle. The system may utilize sensors to receive second data indicative of other data from the occupant. The system may then calculate a gaze vector based on the data indicative of the eye gaze of the occupant. The system may determine a focal point based on the gaze vector. In response to determining the focal point, the system causes an operation to be performed in the vehicle based on the second data.

20 Claims, 16 Drawing Sheets

(51) Int. Cl.
*G06N 3/02* (2006.01)
*G06N 20/00* (2019.01)
*G06V 20/59* (2022.01)

(58) Field of Classification Search
CPC ...... G06V 20/20; G06V 10/14; G06V 10/267; G06V 10/36; G06V 10/457; G06V 10/765; G06V 10/95; G06V 20/50; G06V 10/759; G06V 20/56; G06V 10/25; G06V 20/52; G06V 10/751; G06V 10/7792; G06V 40/10; G06V 20/53; G06V 10/70; G06N 3/045; G06N 3/08; G06N 3/084; G06N 3/0455; G06N 3/0464; G06N 3/04; G06N 3/044; G06N 3/047; G06N 3/082; G06T 2207/20081; G06T 7/11; G06T 2207/20084; G06T 2207/10024; G06T 7/12; G06T 2207/10004; G06T 2207/10016; G06T 7/0008; G06T 2207/30232; G06T 7/194; G06T 17/00
See application file for complete search history.

(56) References Cited

U.S. PATENT DOCUMENTS

| | | | |
|---|---|---|---|
| 2013/0307771 A1* | 11/2013 | Parker | G06F 3/167 345/158 |
| 2014/0136187 A1 | 5/2014 | Wolverton et al. | |
| 2014/0362110 A1* | 12/2014 | Stafford | G06T 19/006 345/633 |
| 2016/0170413 A1 | 6/2016 | Mueller | |
| 2016/0224852 A1* | 8/2016 | Vicente | B60Q 9/00 |
| 2017/0278305 A1* | 9/2017 | Sisbot | G02B 27/0101 |
| 2019/0025815 A1 | 1/2019 | Saadoun et al. | |
| 2020/0310548 A1 | 10/2020 | Wieczorek et al. | |
| 2021/0146944 A1 | 5/2021 | Kundu | |
| 2021/0397859 A1* | 12/2021 | Arora | G06V 40/19 |

OTHER PUBLICATIONS

IEC 61508, "Functional Safety of Electrical/Electronic/Programmable Electronic Safety-related Systems," https://en.wikipedia.org/wiki/IEC_61508, accessed on Apr. 1, 2022, 7 pgs.
ISO 26262, "Road vehicle—Functional safety," International standard for functional safety of electronic system, https://en.wikipedia.org/wiki/ISO_26262, accessed on Sep. 13, 2021, 8 pgs.
Roche, Jason; International Preliminary Report on Patentability for PCT Application No. PCT/US2021/029411, filed Apr. 27, 2021, mailed Nov. 10, 2022, 13 pgs.
"Taxonomy and Definitions for Terms Related to Driving Automation Systems for On-Road Motor Vehicles", Society of Automotive Engineers (SAE), Standard No. J3016-201609, pp. 30 (Sep. 30, 2016).
"Taxonomy and Definitions for Terms Related to Driving Automation Systems for On-Road Motor Vehicles", Society of Automotive Engineers (SAE), Standard No. J3016-201806, pp. 35 (Jun. 15, 2018).
Roche, Jason, Final Office Action for U.S. Appl. No. 16/859,741, filed Apr. 27, 2020, mailed Feb. 14, 2023, 22 pgs.
Roche, Jason; Notice of Allowance for U.S. Appl. No. 16/849,741, filed Apr. 27, 2020, mailed Jun. 6, 2023; 18 pgs.
Roche, Jason; Restriction Requirement for U.S. Appl. No. 16/859,741, filed Apr. 27, 2020, mailed Apr. 8, 2022, 6 pgs.
Roche, Jason; International Search Report and Written Opinion for PCT Application No. PCT/US2021/029411, filed Apr. 27, 2021, mailed Nov. 4, 2021, 16 pgs.
Roche, Jason; Invitation to Pay Additional Fees for PCT Application No. PCT/US2021/029411, filed Apr. 27, 2021, mailed Sep. 13, 2021, 11 pgs.

* cited by examiner

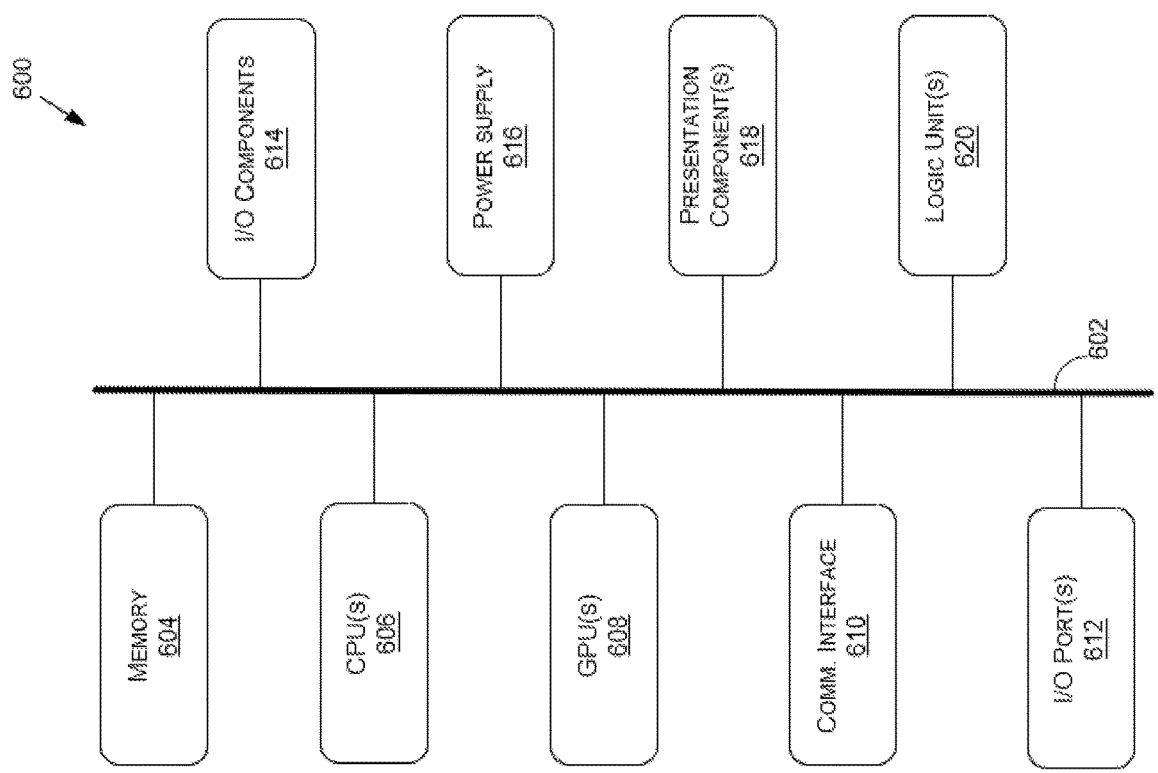

700

800

900

SYSTEMS AND METHODS FOR PERFORMING OPERATIONS IN A VEHICLE USING GAZE DETECTION

CROSS-REFERENCE TO RELATED APPLICATIONS

This application is a continuation of U.S. patent application Ser. No. 16/859,741, filed Apr. 27, 2020, which is hereby incorporated by reference in its entirety.

BACKGROUND

The present disclosure is directed to techniques for operating a vehicle, specifically techniques for performing operations using gaze detection.

SUMMARY

Vehicle systems may implement voice commands to perform specific vehicle operations. In a particular approach, the system may require a physical button (e.g., push to talk) to be pressed by an occupant to engage the system to receive a voice command. This approach is cumbersome in a scenario where other occupants wish to initiate a voice command but cannot press the button due to lack of physical access. Moreover, requiring an occupant to actuate a button to engage a voice command may be inefficient, inconvenient, or even unsafe while driving.

Accordingly, to overcome the limitations of current voice command systems for vehicles, systems and methods are described herein for a vehicle command operation system that may use technology across multiple modalities to cause vehicular operations to be performed in response to determining a focal point based on a gaze of an occupant. The system may utilize sensors to receive first data indicative of an eye gaze of an occupant of the vehicle. For example, the system receives image data of the occupant gazing at the entertainment console. The system may then calculate a gaze vector based on the data indicative of the eye gaze of the occupant. For example, the system determines a gaze vector in three-dimensional space of the occupant's eye gaze towards the entertainment console. The system may determine a focal point based on the gaze vector. For example, the system determines that the entertainment console is the focal point along the gaze vector. The system may utilize sensors to receive second data indicative of other data from the occupant. For example, the system receives audio data from the occupant via a microphone sensor upon the occupant uttering a voice command. In response to determining the focal point, the system may cause an operation to be performed in the vehicle based on the second data. For example, the system determines an associated operation for the vehicle upon parsing the audio data from the occupant to shift the entertainment interface from the entertainment console to the heads-up display. The system may then cause the entertainment interface to be removed from the entertainment console and displayed on the heads-up display of the vehicle.

In some embodiments, the system may retrieve a spatial mapping of an interior of the vehicle. For example, the spatial mapping may be a three-dimensional mapping of the vehicle stored on board in memory within the vehicle, which is retrieved by the system. The system may receive first data indicative of an eye gaze of the occupant in the vehicle and calculate a gaze vector based on the data indicative of the eye gaze of the occupant (e.g., using a neural network). The system may then determine a position of at least one intersection point where the gaze vector intersects with a region of the spatial mapping. For example, the system determines xyz coordinates where the gaze vector intersects with a spatial coordinate of the spatial mapping corresponding to a left interior air vent of the vehicle. In response to the determination of the position of at least one intersection point, the system may cause an operation to be performed at a region within the vehicle associated with the region of the spatial mapping. For example, the system, upon determining the intersection point corresponds to the left interior air vent, causes the cabin air fan to blow at a higher speed.

In some embodiments, the system may calculate the gaze vector using at least one hardware accelerator. For example, a hardware accelerator such as a programmable vision accelerator may be used to calculate the gaze vector. In some embodiments, the system may use a neural network to receive the first data as input.

In some embodiments, the system may determine a focal point from multiple focal points by retrieving a historical focal point associated with the occupant to perform disambiguation of multiple focal points. For example, the system receives a historical focal point where the occupant is associated with historical data of gaze detection directed at a left interior air vent. The system may then determine whether the historical focal point is within a proximity threshold of one of the multiple focal points. If so, the system may determine that one of the multiple focal points is the desired focal point. In some embodiments, the system may retrieve a historical focal point upon a determination of an operation count. The operation count may count the number of occurrences a particular operation was performed in the vehicle associated with the historical focal point. If the operation count exceeds a confidence threshold value, the system may retrieve the historical focal point associated with the applicant.

In some embodiments, the system may receive data from the occupant to calibrate a gaze trigger. The system may receive second data (e.g., data indicative of the region of the spatial mapping) from an occupant of the vehicle when determining the at least one intersection point. In some embodiments, the system may receive the second data from at least one of a graphical user interface or parsed audio data. In some embodiments, the system may retrieve a historical intersection point associated with the occupant when determining the at least one intersection point. The historical intersection point may be within a proximity threshold of the at least one intersection point.

BRIEF DESCRIPTION OF THE DRAWINGS

The below and other objects and advantages of the disclosure will be apparent upon consideration of the following detailed description, taken in conjunction with the accompanying drawings, in which like reference characters refer to like parts throughout, and in which:

FIG. 3B is an illustration of an example of an interior view of a vehicle with an occupant seated in a rear passenger seat providing audio data captured by a camera sensor, in accordance with some embodiments of the present disclosure;

FIG. 6 is a block diagram of an example computing device suitable for use in implementing some embodiments of the present disclosure;

DETAILED DESCRIPTION

In some embodiments, processing circuitry may, via techniques disclosed herein, initiate and/or execute vehicle operations based on a determined focal point of an occupant within a vehicle. The processing circuitry, which may be any processing circuitry such as those disclosed herein, may receive data indicative of an eye gaze of an occupant in a vehicle. The processing circuitry may receive the data from one or more sensors. In at least one embodiment, sensor data may be received from, for example and without limitation, inertial measurement unit ("IMU") sensor(s) (e.g., accelerometer(s), gyroscope(s), magnetic compass(es), magnetometer(s), etc.); microphone(s); stereo camera(s); wide-view camera(s) (e.g., fisheye cameras); infrared camera(s); surround camera(s) (e.g., 360 degree cameras); long-range cameras (not shown in FIG. 5A); mid-range camera(s); interior cameras; speed sensor(s) (e.g., for measuring speed of a vehicle); vibration sensor(s); steering sensor(s); brake sensor(s) (e.g., as part of a brake sensor system); and/or other sensor types.

Figure 1A:
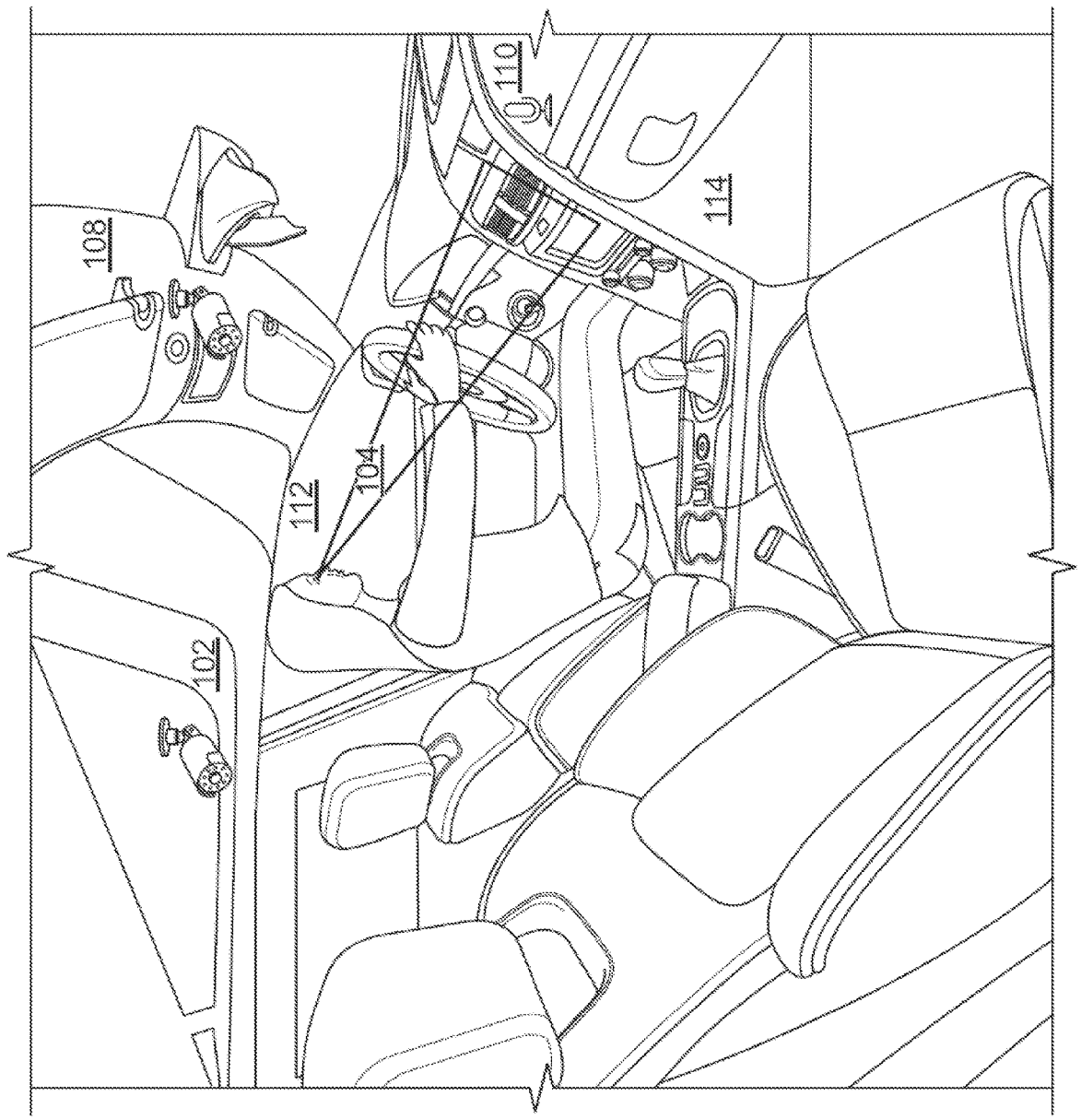
FIG. 1A is an illustration of an example of an interior view of a vehicle with an occupant directing a gaze at the entertainment console, in accordance with some embodiments of the present disclosure.

FIG. 1A illustrates a diagram 100 showing an example interior view of a vehicle with an occupant directing a gaze at the entertainment console, in accordance with some embodiments of the disclosure. An occupant 102 is seated in the driver's seat of the vehicle while momentarily directing her gaze 104 at the entertainment console. An interior camera sensor 108 is mounted in the roof of the interior while a microphone sensor 110 is mounted within the entertainment console. The processing circuitry may receive first data indicative of an eye gaze of an occupant (e.g., image data from camera sensor 108 to determine the occupant's gaze directed to the entertainment console).

Figure 1B:
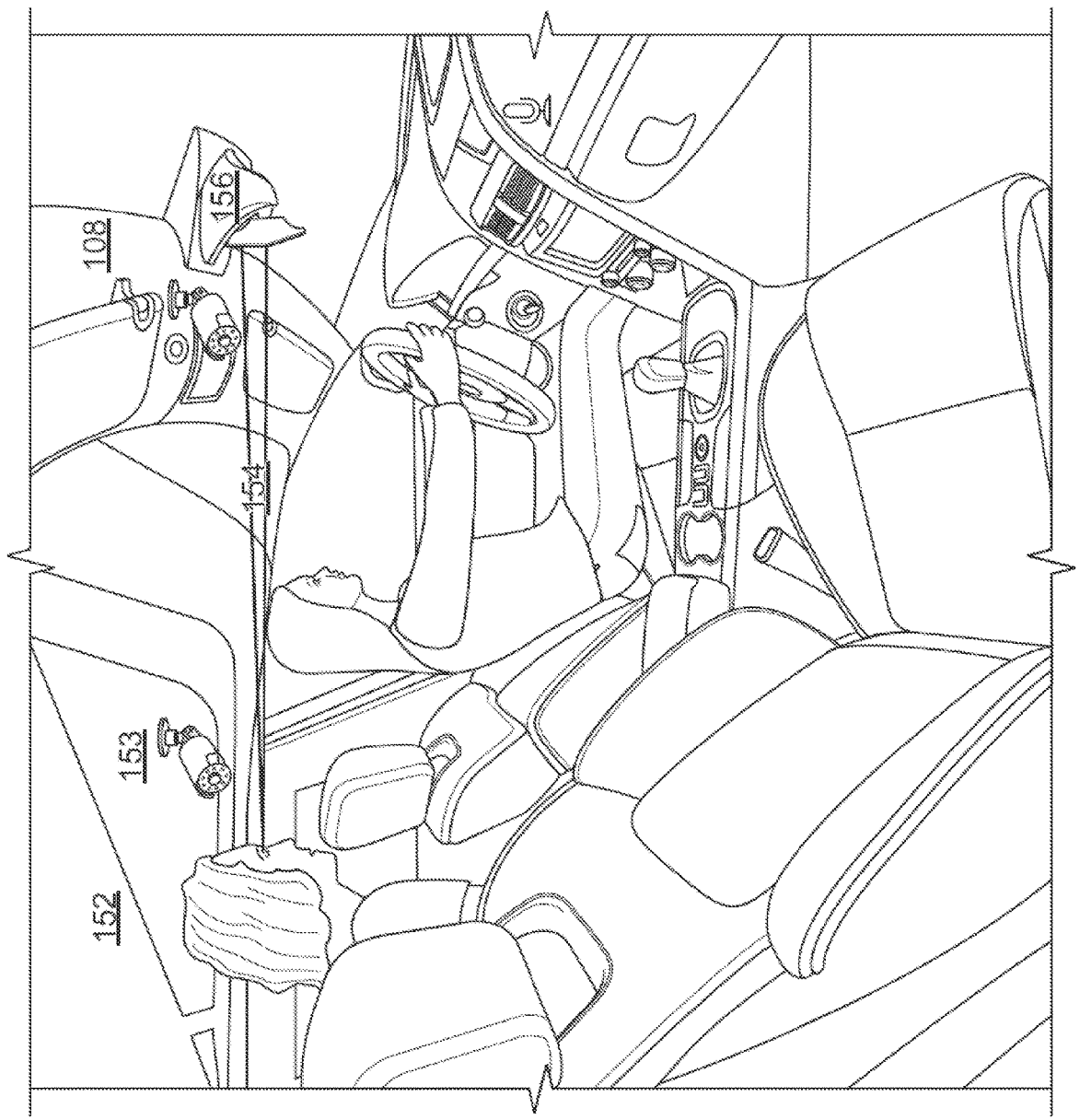
FIG. 1B is an illustration of an example of an interior view of a vehicle with an occupant seated in a rear passenger seat directing a gaze at the rearview mirror, in accordance with some embodiments of the present disclosure.

It should be understood that FIG. 1A-1B, and other arrangements described herein, are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The processing circuitry may calculate a gaze vector based on the first data indicative of the eye gaze of the occupant, as described herein. In some embodiments, parallel processing circuitry may implement a machine learning model (e.g., a neural network) to calculate the gaze vector, such as described above. The machine learning model may utilize the first data (e.g., received sensor data such as image data) and compare, utilizing a neural network, a calculated gaze via a gaze vector. The machine learning model may be trained with a dataset comprising image data. In some embodiments, the training dataset may use historical image data of the occupant within a vehicle. In some embodiments, the training dataset may include image data of the occupant's gaze in other environments (e.g., a home setting where image data is retrieved from a home security camera and/or laptop or mobile phone cameras). Even though the image data of the occupant may be from different environments, the occupant's gaze orientation may be learned by the machine learning model. In some embodiments, the training dataset comprises preset data (e.g., a default occupant and a default environment). The gaze vector may be a straight line in three-dimensional space. For example, the gaze vector in the above example from FIG. 1A may include one intersection point at the eyes of the occupant 112 and a second intersection point at a point on the surface of the entertainment console 114. In some embodiments, these intersection points are recorded within a matrix. This matrix may be stored within a memory storage by the processing circuitry.

FIG. 1B illustrates a diagram 150 showing an example interior view of a vehicle with an occupant seated in a rear passenger seat directing a gaze at the rearview mirror, in accordance with some embodiments of the disclosure. In this example, the occupant 152 is seated in a rear passenger seat of the vehicle. As depicted in FIG. 1B, the occupant 152 is directing his gaze 154 at the rearview mirror 156. The processing circuitry may receive first data (e.g., image data from camera sensor 108 and/or a secondary camera sensor 153) to determine the occupant and the respective gaze of the occupant being directed to the rearview mirror 156. In some embodiments, the receipt of the gaze detection may come from any occupant within the vehicle.

The processing circuitry may determine a focal point based on a determined gaze vector. In some embodiments, the processing circuitry may determine, based on one or more intersection points of the gaze vector, a focal point. The focal point may be a specific point or set of contiguous points along the gaze vector. In some embodiments, the focal point may be referred to as a point of regard. In some embodiments, the machine learning model may select a point from the one or more intersection points based on a trained neural network. The neural network may be trained with a dataset of a set of objects inside a vehicle with corresponding spatial coordinates. For example, and without limitation, a gaze vector of an occupant may include the entertainment console and a cup holder below a protruding entertainment console. The neural network would determine that the focal point is the entertainment console instead of the cup holder. In some embodiments, the neural network is trained with occupant-specific data. For example, the neural network may be trained with video data of the occupant from historical trips the occupant has taken in the vehicle. The neural network may learn where the occupant generally directs their gaze, their preferred operations, and other similar preferences.

In some embodiments, the processing circuitry determines the focal point by determining a first focal point based on the gaze vector and a second focal point based on the gaze vector. There may be multiple prospective focal points which require disambiguation. For example, the processing circuitry may determine, along the gaze vector, there is a first focal point that may be the signal indicator stalk protruding from the steering wheel, while a second focal point (along the same gaze vector) may be a heated seats button on the central console located behind the signal indicator stalk. The processing circuitry may deem these focal points as being ambiguous.

Regarding one approach to disambiguate the multiple focal points, the processing circuitry may retrieve a historical focal point associated with the occupant, wherein the historical focal point is within a proximity threshold of the first focal point. The historical focal point may be retrieved by the processing circuitry from a memory storage. In some embodiments, the historical focal point may be retrieved from another device associated with the occupant. In some embodiments, the historical focal point may be retrieved from a database. In some embodiments, there may be a plurality of historical focal points retrieved. For example, historical focal points may include the signal indicator stalk being selected as the focal point repeatedly. These focal points are compared with the gaze vector to ensure that the respective focal point is within a proximity threshold. The proximity threshold may be of any measure such as, but not limited to, difference in angle, difference in 3D space, difference in spatial coordinates, difference in value relative to standard deviation of gaze vector, or similar metric to determine positional difference. In some embodiments, the proximity threshold may be predefined, preset, or set by the occupant. In response to a determination that the proximity threshold is met, the focal point falling within the proximity threshold is determined, by processing circuitry, to be the focal point. For example, the first focal point being the signal indicator stalk is determined to be the focal point.

In some scenarios, the first focal point and the second focal point are both within the proximity threshold. The processing circuitry may determine the focal point based on which of the first focal point and the second focal point has a smaller difference to the proximity threshold as the selected focal point. In some embodiments, the vehicle may provide an option via a graphical user interface ("GUI") and/or an audio interface for selection of the correct focal point. Upon receiving a confirmatory selection (e.g., via the GUI or via voice data from an occupant), the focal point is determined.

In some embodiments, retrieving a historical focal point associated with the occupant includes determining an operation count comprising an amount of times a particular operation was performed in the vehicle associated with the historical focal point. For example, if the historical focal point was the signal indicator stalk, the processing circuitry would determine how many times the occupant gazed at the signal indicator stalk as a focal point. The processing circuitry may determine that the occupant gazed at the signal indicator stalk 30 times within a two-day period. In response to the operation count exceeding a threshold confidence value, the processing circuitry may retrieve the historical focal point associated with the occupant. The confidence value may be predefined, preset, or set by the occupant.

Upon determining the focal point, the processing circuitry may cause an operation to be performed in the vehicle. The operation to be performed may be performed by the one or more hardware components of the vehicle. For example, the vehicle may be equipped with various hardware components capable of providing a specific operation relating to the entertainment console, when the focal point is determined to be the entertainment console. In some embodiments, upon determining the focal point, the processing circuitry may cause an operation to be performed in the vehicle based on the second data (e.g., the other data received from the occupant). For example, the operation relating to the entertainment console may be based on parsed audio data received from a microphone sensor (e.g., second data) from a voice command uttered by the occupant.

Figure 2A:
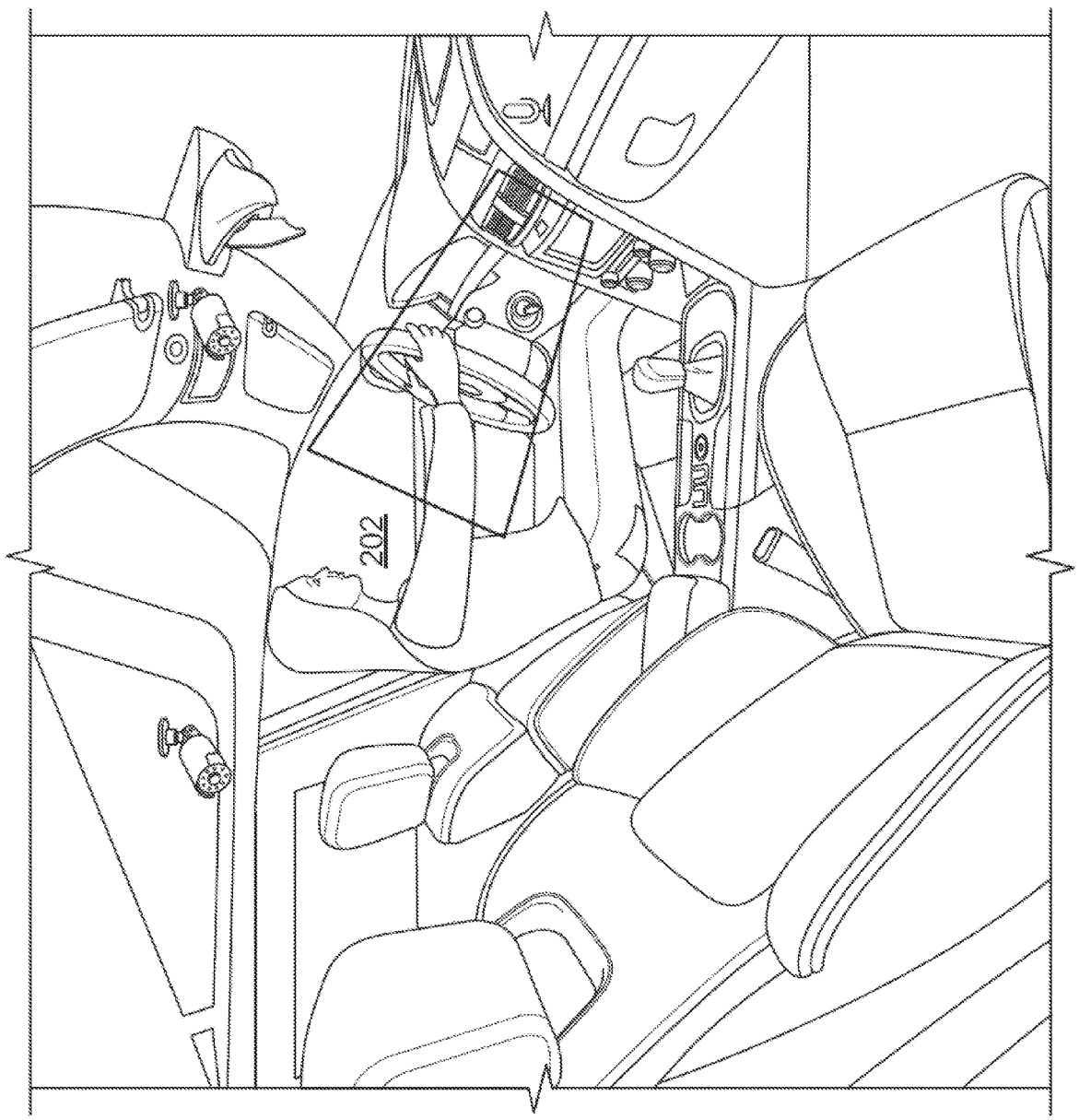
FIG. 2A is an illustration of an example of an interior view of a vehicle with the focal point being an entertainment console, in accordance with some embodiments of the present disclosure.

FIG. 2A illustrates a diagram 200 showing an interior view of a vehicle with the focal point being an entertainment console, in accordance with some embodiments of the disclosure. Subsequent to determining the focal point as the entertainment console, the processing circuitry transmits an instruction to the entertainment console to switch modes from "sleep" to "engaged." In sleep mode, the entertainment console's GUI may not display any graphical interface, or the graphical interface may be dimmed. The engaged mode of the entertainment console provides for a graphical interface with display, or a screen with increased brightness 202 which provides enablement for further queries or requests from the occupant for specific operations. For example, the entertainment console, now with brightness and user interface ("UI") engaged, is responsive to receiving a particular radio station to tune to. Consequently, the system, upon recognition of the focal point being the entertainment console, alters the operating mode of the entertainment console. In this way, the system may use gaze as a trigger or "wake word" for multimodal systems (e.g., digital personal assistants, conversational user interfaces, and other similar interfaces). In other embodiments, a conventional audio-based trigger may be received by a microphone sensor within the vehicle. In this example, to disambiguate multiple voices due to similar-sounding voices and/or noisy audio signals, a gaze trigger may be used in conjunction with the audio-based trigger to determine the correct occupant for performing the vehicular operational command.

Figure 2B:
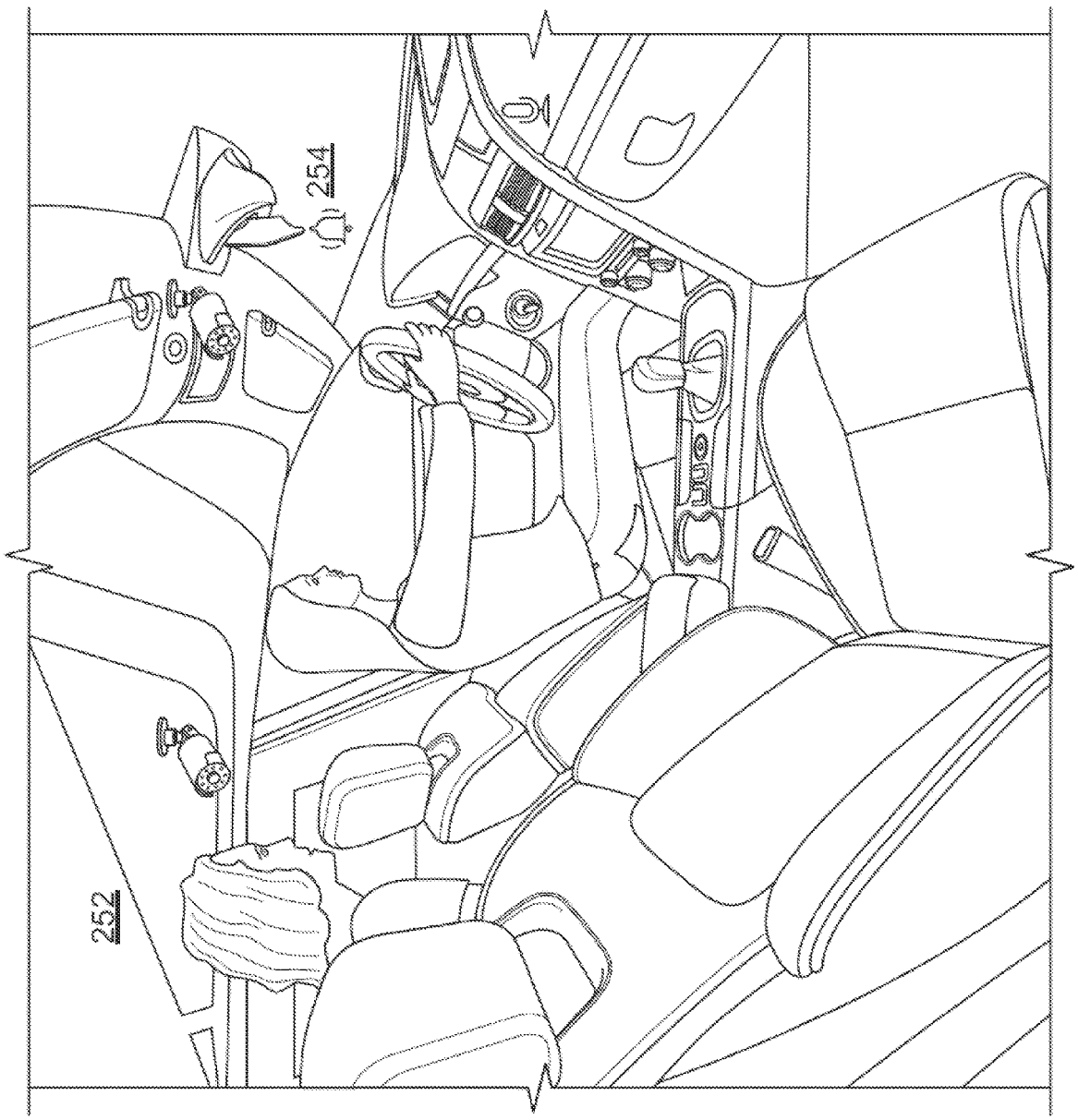
FIG. 2B is an illustration of an example of an interior view of a vehicle with the focal point being the rearview mirror, in accordance with some embodiments of the present disclosure.

FIG. 2B illustrates a diagram 250 showing an example interior view of a vehicle with the focal point being the rearview mirror, in accordance with some embodiments of the disclosure. In this example, the processing circuitry may determine that the rearview mirror is the focal point. In some embodiments, upon determination of the focal point, the processing circuitry may provide an acknowledgement to the occupant 252 of the vehicle. For example, upon determination that the focal point is the rearview mirror, an audible chime emits from the rearview mirror 254. This chime provides feedback to the occupant that the intended focal point has been correctly selected. In some embodiments, the acknowledgement may be any one of an audial tone, a visual signal, a haptic feedback, a vibration, a communication message to a user device/vehicle interface, and other similar feedback methods.

Figure 3A:
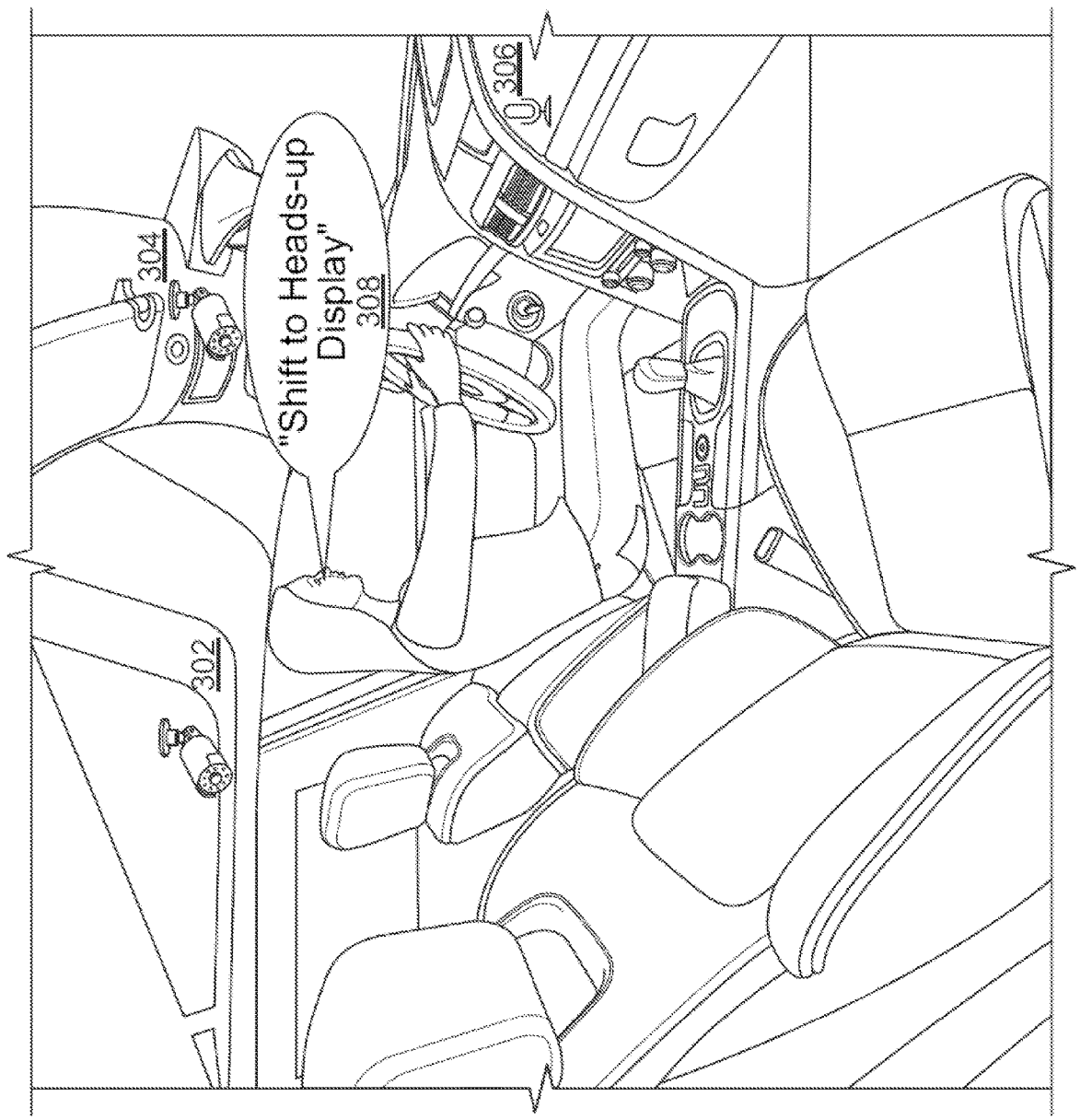
FIG. 3A is an illustration of an example of an interior view of a vehicle with an occupant providing audio data captured by a camera sensor, in accordance with some embodiments of the present disclosure.

In some embodiments, the processing circuitry may receive, from sensors in the vehicle, second data indicative of other data from the occupant. FIG. 3A illustrates a diagram 300 showing an example interior view of a vehicle with an occupant providing audio data captured by a camera sensor, in accordance with some embodiments of the disclosure. For example, an interior camera 304 may receive lip activity of the occupant 302 who moves her lips to mouth the words "Shift to heads-up display" 308. The lip activity may be converted into textual information (e.g., lip activity processing may provide textual information being uttered by the occupant). In some embodiments, the other data may be audio data received by the vehicle interior microphone sensor 114. The processing circuitry may determine an operation associated with the other data. For example, the processing circuitry may determine the occupant has uttered the phrase, "Shift to heads-up display." The processing circuitry will determine that a corresponding operation within the entertainment console is to adjust the user interface for the vehicle to the heads-up display on the windshield. The processing circuitry may then cause the operation to be performed in the vehicle. In another example, the occupant may be directing his gaze to the rearview mirror in which the occupant has view of the rear passenger window. The processing circuitry may receive other data in the form of audio data captured by the microphone sensor 306, where the audio data contains the voice command "Lower the rear window." The processing circuitry may parse the audio data into discrete words for further processing. The processing circuitry may use a neural network to determine, based on the previously determined gaze vector and focal point being the rear passenger-side window and the other data (e.g., words) being "Lower the rear window," an associated operation is a vehicular command operation to lower the rear passenger-side window. The processing circuitry may then authorize a command to the vehicle to lower the rear passenger-side window.

FIG. 3B illustrates a diagram 350 showing an example interior view of a vehicle with an occupant seated in a rear passenger seat providing audio data captured by a camera sensor, in accordance with some embodiments of the disclosure. In this example, an interior camera 304 may receive lip activity of the occupant 352 who moves his lips to mouth the words "Increase fan speed for rear vents" 354.

In some embodiments, processing circuitry may calculate the gaze vector using at least one hardware accelerator. For example, a hardware accelerator such as a programmable vision accelerator or a deep learning accelerator may be used to calculate the gaze vector. A hardware accelerator may be a dedicated hardware module to perform a defined set of processes. In some embodiments, the hardware accelerators may include specialized hardware that is designed to perform a defined set of processes with enhanced efficiency. In some embodiments, the system may use a neural network to receive as input the data indicative of an eye gaze of the occupant. The neural network may be any one of a generative adversarial network, a convolutional neural network, or a recurrent neural network.

Figure 4A:
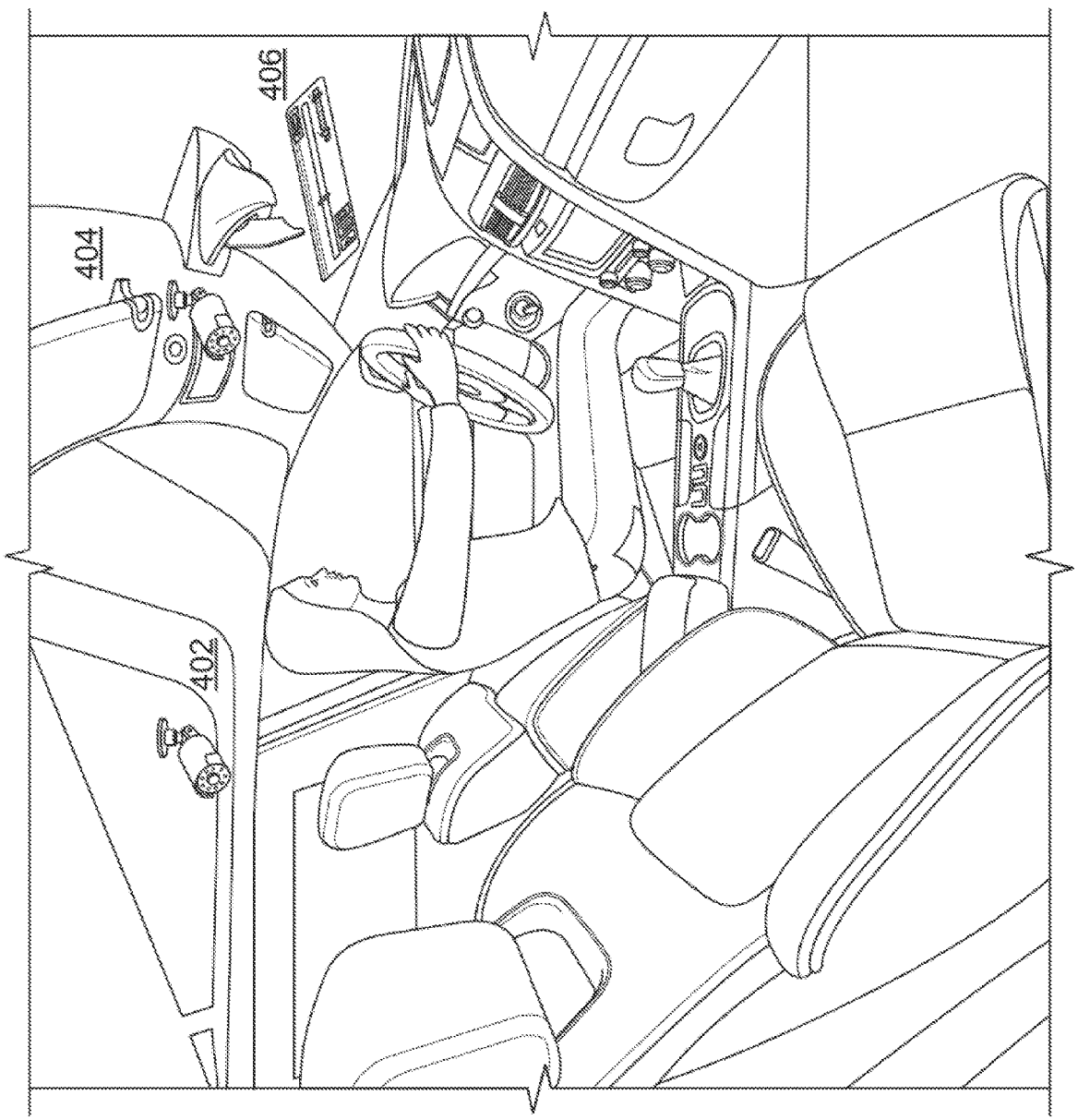
FIG. 4A is an illustration of an example of an interior view of a vehicle with an occupant adjusting a user interface of an entertainment console, in accordance with some embodiments of the present disclosure.

FIG. 4A illustrates a diagram 400 showing an example interior view of a vehicle with an occupant adjusting a user interface of an entertainment console, in accordance with some embodiments of the disclosure. As shown previously, the system received camera sensor information from the camera 404 of the occupant 402 mouthing the words "shift to heads-up display." The system, based on the occupant's focal point and the determined mouthed words, causes the user interface of the entertainment console to be projected on the windshield 406. Alternatively, the vehicle operation may be performed via voice command using audio data captured by a microphone that is invoked (e.g., activated) by a determination of the occupant's gaze.

Figure 4B:
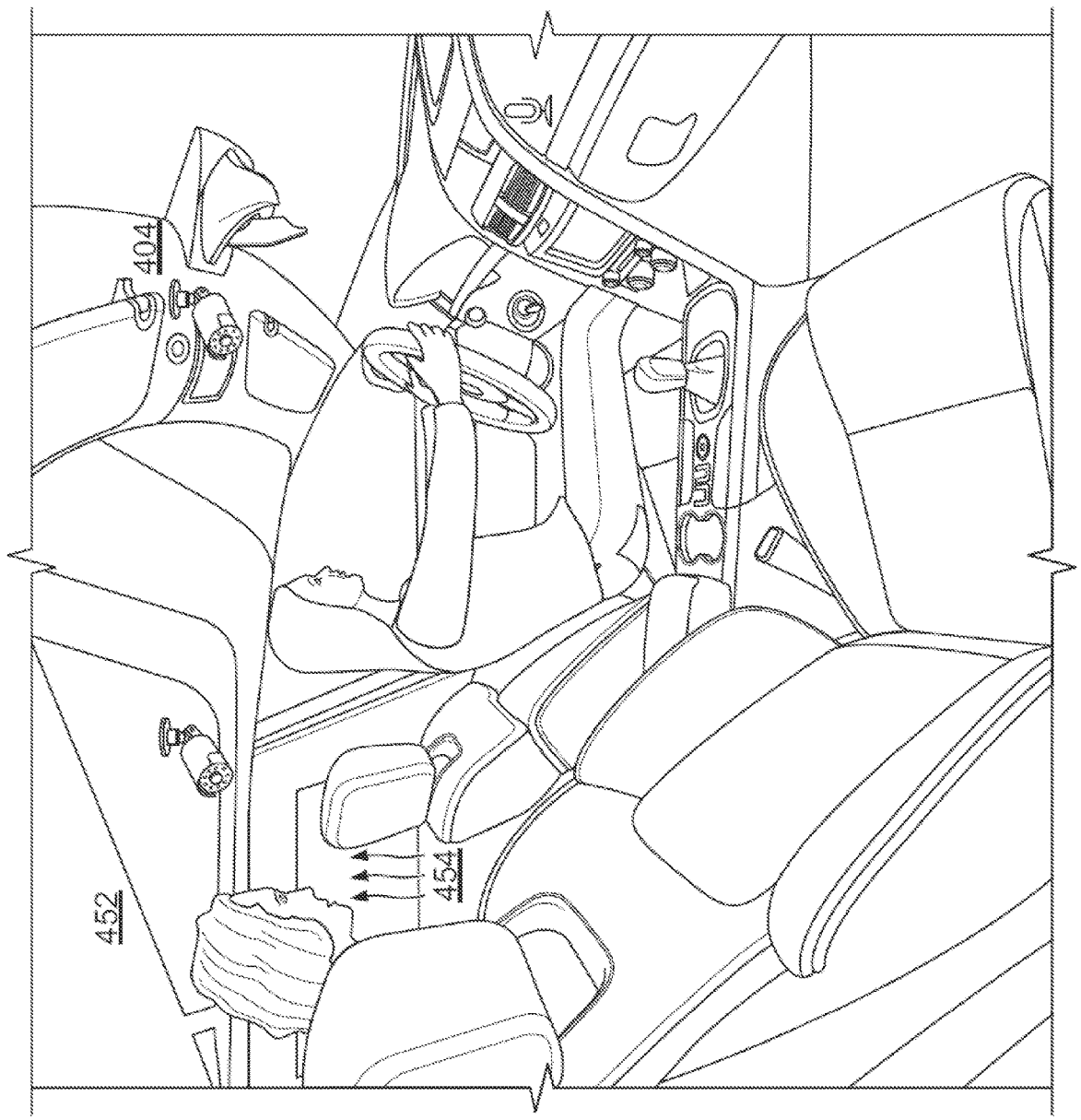
FIG. 4B is an illustration of an example of an interior view of the vehicle with an adjustment of vehicular operations, in accordance with some embodiments of the present disclosure.

FIG. 4B illustrates a diagram 450 showing an example interior view of the vehicle with an adjustment of vehicular operations, in accordance with some embodiments of the disclosure. In this example, as shown previously, the system received camera sensor information from the camera 404 of the occupant 452 mouthing the words "increase fan speed for rear vents." The processing circuitry, based on the occupant's focal point and the determined mouthed words, causes the vehicular operation of increasing the fan speed for the rear vents 454. Alternatively, the vehicle operation may be performed via voice command using audio data captured by a microphone that is invoked (e.g., activated) by a determination of the occupant's gaze. In some embodiments, if a focal point is not detected at a specific region within the interior of the vehicle, an alternative operation associated with the specific region may be performed. For example, if a focal point is determined to be the entertainment console, and three minutes elapse without a requested operation or another determined focal point of the entertainment console, then the system may cause an alternative operation to be performed on the entertainment console to switch the mode to a lower power or "sleep" mode which dims or turns off the display of the entertainment console.

In some embodiments, upon detection of a focal point, the processing circuitry may cause an acknowledgement signal to be emitted. The acknowledgement signal may be any type of communicative interface such as audio based, visual based, haptic, temperature based, and/or any combination thereof. For example, upon the processing circuitry determining the focal point being the entertainment console, the processing circuitry may provide a bright blink of the screen of the entertainment console to indicate that the focal point has been determined. In other embodiments, a haptic response through a portion of the steering wheel may indicate that a focal point has been determined. In yet other embodiments, a chime may be output by the system upon determination of the focal point.

In some embodiments, the processing circuitry retrieves a spatial mapping of an interior of the vehicle from a memory storage. In some embodiments, the spatial mapping may be a three-dimensional coordinate space of the interior of the vehicle. The spatial mapping may be any positional system to demark the interior of the vehicle. The spatial mapping may be utilized to calculate the gaze vector based on the data indicative of the eye gaze of the occupant. A machine learning model (e.g., a neural network) may be implemented to calculate the gaze vector. The inputs for the machine learning model include the image data of the occupant's eye gaze (e.g., infrared camera(s) and/or camera(s) image capture of the occupant inside the vehicle). The machine learning model may be trained as discussed previously.

The processing circuitry may determine a position of at least one intersection point where the gaze vector intersects within a region of the spatial mapping. The position may be any format of positional data. For example, positional data may include, but is not limited to, coordinates, equations, relative position relative to another position, or other similar positional data. A region of the spatial mapping may be a subset of the spatial mapping of the interior of the vehicle. In some embodiments, the region may be a small 3D space region (e.g., one cubic centimeter). In some embodiments, the granularity of the region may be preset by the system or selected by the system through a user interface. In some embodiments, the region may be adjusted based on accuracy of the determined region. Feedback on accuracy may be determined by the processing circuitry based on occupant behavior, and/or direct feedback through a user interface (e.g., GUI or audio input) within the vehicle.

In some embodiments, in determining of at least one intersection point, the processing circuitry may retrieve a historical intersection point associated with the occupant. The historical intersection point may be within a proximity threshold of the at least one intersection point. The historical intersection point may be retrieved by the processing circuitry from a memory storage. In some embodiments, the historical intersection point may be retrieved from another device associated with the occupant. In some embodiments, the historical intersection point may be retrieved from a database. In some embodiments, there may be a plurality of historical intersection points retrieved. For example, the historical intersection point may include the left most HVAC vent being selected as the historical intersection point.

In response to the determination of a position of an intersection point, the processing circuitry may cause an operation to be performed at a region within in the vehicle associated with the region of the spatial mapping. In some embodiments, the operation may be determined based on a look-up table where a particular intersection point corresponds to a particular operation to be performed within the vehicle. In some embodiments, the region at which the operation is caused to be performed is proximate to the determined position of the intersection point. In other embodiments, the region at which the operation is caused to be performed is not spatially proximate to the determined position of the intersection point. In some embodiments, the operation may be determined based on a machine learning model (e.g., a neural network). The machine learning model may be trained with a training dataset with specific operations to be performed based on various inputs (e.g., intersection points within the vehicle).

In some embodiments, the processing circuitry receives second data indicative of the region of the spatial mapping. The second data is received from the occupant of the vehicle. For example, the processing circuitry may receive a specific region of the interior of the vehicle calibrated by the occupant. This calibrated region may act as a gaze trigger. When the occupant directs his gaze to this calibrated region, the processing circuitry may determine the specific operation to be performed if the gaze vector intersects with the calibrated region. For example, the occupant may set the top left of the windshield to be a preset calibrated region. Upon the occupant gazing at the top left windshield, the processing circuitry determines that a preprogrammed operation is caused to be performed within the vehicle (e.g., dimming of interior ambient lighting). In some embodiments, the data indicative of the region of the spatial mapping from an occupant of the vehicle comprises selection of the region via a GUI by the occupant. For example, the occupant may be able to visually select on a 3D mapping of the interior of the vehicle shown on the GUI on the entertainment console, the region of the calibrated region of spatial mapping. In other embodiments, the data indicative of the region of the spatial mapping from an occupant of the vehicle comprises selection of the region via parsed audio data. For example, the occupant may speak into the microphone sensor "my calibrated region is the top left section of the windshield." The processing circuitry may receive this audio data, parse it into keywords, and subsequently determine that the region of the calibrated region of spatial mapping is to be set as the spatial mapping of the top left section of the windshield. In some embodiments, the spatial mapping is generated by the vehicle on an on-demand basis using image data from one or more camera sensors and/or similar sensors utilized to generate a spatial mapping.

Figure 5A:
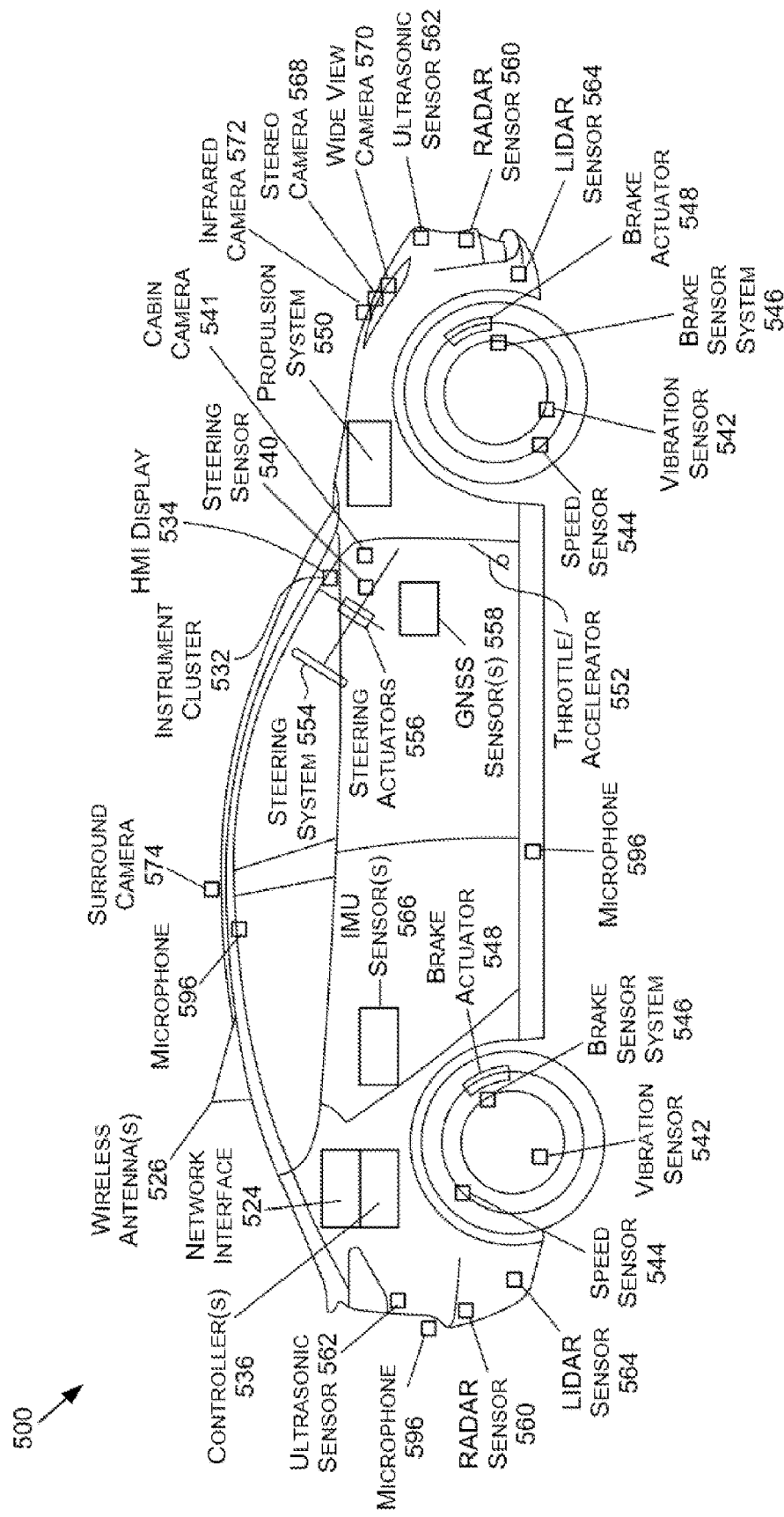
FIG. 5A is an illustration of an example autonomous vehicle, in accordance with some embodiments of the present disclosure.

FIG. 5A is an illustration of an example autonomous vehicle 500, in accordance with some embodiments of the present disclosure. The autonomous vehicle 500 (alternatively referred to herein as the "vehicle 500") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 500 may be capable of functionality in accordance with one or more of Level 3-Level 5 of the autonomous driving levels. For example, the vehicle 500 may be capable of conditional automation (Level 3), high automation (Level 4), and/or full automation (Level 5), depending on the embodiment.

The vehicle 500 may include components such as a chassis, a vehicle body, wheels (e.g., 2, 4, 6, 8, 18, etc.), tires, axles, and other components of a vehicle. The vehicle 500 may include a propulsion system 550, such as an internal combustion engine, hybrid electric power plant, an all-electric engine, and/or another propulsion system type. The propulsion system 550 may be connected to a drive train of the vehicle 500, which may include a transmission, to enable the propulsion of the vehicle 500. The propulsion system 550 may be controlled in response to receiving signals from the throttle/accelerator 552.

A steering system 554, which may include a steering wheel, may be used to steer the vehicle 500 (e.g., along a desired path or route) when the propulsion system 550 is operating (e.g., when the vehicle is in motion). The steering system 554 may receive signals from a steering actuator 556. The steering wheel may be optional for full automation (Level 5) functionality.

The brake sensor system 546 may be used to operate the vehicle brakes in response to receiving signals from the brake actuators 548 and/or brake sensors.

Controller(s) 536, which may include one or more CPU(s), system on chips (SoCs) 504 (FIG. 5C) and/or GPU(s), may provide signals (e.g., representative of commands) to one or more components and/or systems of the vehicle 500. For example, the controller(s) may send signals to operate the vehicle brakes via one or more brake actuators 548, to operate the steering system 554 via one or more steering actuators 556, and/or to operate the propulsion system 550 via one or more throttle/accelerators 552. The controller(s) 536 may include one or more onboard (e.g., integrated) computing devices (e.g., supercomputers) that process sensor signals, and output operation commands (e.g., signals representing commands) to enable autonomous driving and/or to assist a human driver in driving the vehicle 500. The controller(s) 536 may include a first controller 536 for autonomous driving functions, a second controller 536 for functional safety functions, a third controller 536 for artificial intelligence functionality (e.g., computer vision), a fourth controller 536 for infotainment functionality, a fifth controller 536 for redundancy in emergency conditions, and/or other controllers. In some examples, a single controller 536 may handle two or more of the above functionalities, two or more controllers 536 may handle a single functionality, and/or any combination thereof.

The controller(s) 536 may provide the signals for controlling one or more components and/or systems of the vehicle 500 in response to sensor data received from one or more sensors (e.g., sensor inputs). The sensor data may be received from, for example and without limitation, global navigation satellite systems sensor(s) 558 (e.g., Global Positioning System sensor(s)), RADAR sensor(s) 560, ultrasonic sensor(s) 562, LIDAR sensor(s) 564, inertial measurement unit (IMU) sensor(s) 566 (e.g., accelerometer(s), gyroscope(s), magnetic compass(es), magnetometer(s), etc.), microphone(s) 596, stereo camera(s) 568, wide-view camera(s) 570 (e.g., fisheye cameras), infrared camera(s) 572, surround camera(s) 574 (e.g., 360 degree cameras), long-range and/or mid-range camera(s) 598, speed sensor(s) 544 (e.g., for measuring the speed of the vehicle 500), vibration sensor(s) 542, steering sensor(s) 540, brake sensor(s) 546 (e.g., as part of the brake sensor system 546), and/or other sensor types.

One or more of the controller(s) 536 may receive inputs (e.g., represented by input data) from an instrument cluster 532 of the vehicle 500 and provide outputs (e.g., represented by output data, display data, etc.) via a human-machine interface (HMI) display 534, an audible annunciator, a loudspeaker, and/or via other components of the vehicle 500. The outputs may include information such as vehicle velocity, speed, time, map data (e.g., the HD map 522 of FIG. 5C), location data (e.g., the location of the vehicle 500, such as on a map), direction, location of other vehicles (e.g., an occupancy grid), information about objects and status of objects as perceived by the controller(s) 536, etc. For example, the HMI display 534 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 500 further includes a network interface 524, which may use one or more wireless antenna(s) 526 and/or modem(s) to communicate over one or more networks. For example, the network interface 524 may be capable of communication over LTE, WCDMA, UMTS, GSM, CDMA2000, etc. The wireless antenna(s) 526 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 5B:
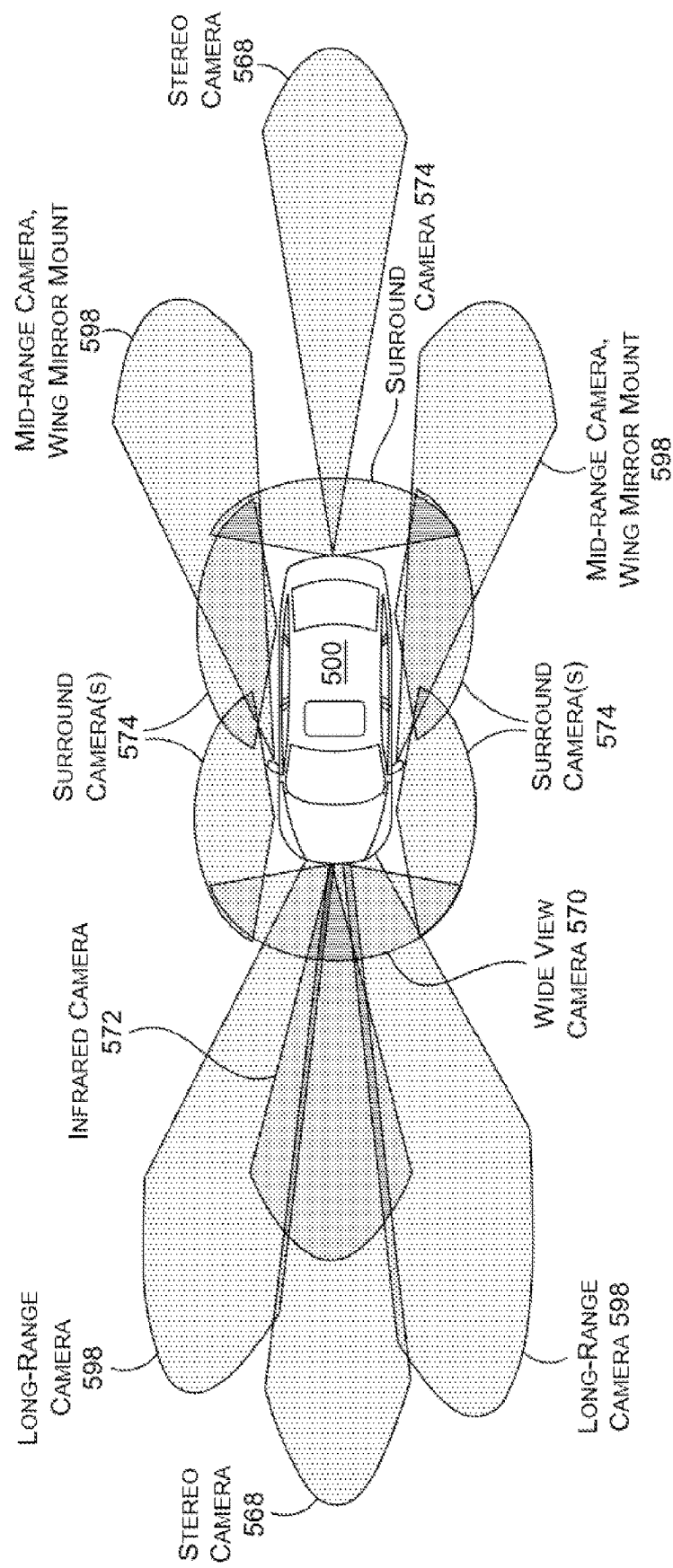
FIG. 5B is an example of camera locations and fields of view for the example autonomous vehicle of FIG. 5A, in accordance with some embodiments of the present disclosure.

FIG. 5B is an example of camera locations and fields of view for the example autonomous vehicle 500 of FIG. 5A, in accordance with some embodiments of the present disclosure. The cameras and respective fields of view are one example embodiment and are not intended to be limiting. For example, additional and/or alternative cameras may be included and/or the cameras may be located at different locations on the vehicle 500.

The camera types for the cameras may include, but are not limited to, digital cameras that may be adapted for use with the components and/or systems of the vehicle 500. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RB GC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom-designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that includes portions of the environment in front of the vehicle 500 (e.g., front-facing cameras) may be used for surround view, to help identify forward-facing paths and obstacles, as well aid in, with the help of one or more controllers 536 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 570 that may be used to perceive objects coming into view from the periphery (e.g., pedestrians, crossing traffic or bicycles). Although only one wide-view camera is illustrated in FIG. 5B, there may any number of wide-view cameras 570 on the vehicle 500. In addition, long-range camera(s) 598 (e.g., a long-view stereo camera pair) may be used for depth-based object detection, especially for objects for which a neural network has not yet been trained. The long-range camera(s) 598 may also be used for object detection and classification, as well as basic object tracking.

One or more stereo cameras 568 may also be included in a front-facing configuration. The stereo camera(s) 568 may include an integrated control unit comprising a scalable processing unit, which may provide a programmable logic (e.g., FPGA) and a multi-core microprocessor with an integrated CAN or Ethernet interface on a single chip. Such a unit may be used to generate a 3-D map of the vehicle's environment, including a distance estimate for all the points in the image. An alternative stereo camera(s) 568 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 568 may be used in addition to, or alternatively from, those described herein.

Cameras with a field of view that includes portions of the environment to the side of the vehicle 500 (e.g., side-view cameras) may be used for surround view, providing information used to create and update the occupancy grid, as well as to generate side impact collision warnings. For example, surround camera(s) 574 (e.g., four surround cameras 574 as illustrated in FIG. 5B) may be positioned around the vehicle 500. The surround camera(s) 574 may include wide-view camera(s) 570, fisheye camera(s), 360-degree camera(s), and/or the like. For example, four fisheye cameras may be positioned on the vehicle's front, rear, and sides. In an alternative arrangement, the vehicle may use three surround camera(s) 574 (e.g., left, right, and rear), and may leverage one or more other camera(s) (e.g., a forward-facing camera) as a fourth surround-view camera.

Cameras with a field of view that include portions of the environment to the rear of the vehicle 500 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 598, stereo camera(s) 568), infrared camera(s) 572, etc.), as described herein.

Cameras with a field of view that include portions of the interior or cabin of vehicle 500 may be used to monitor one or more states of drivers, passengers, or objects in the cabin. Any type of camera may be used including, but not limited to, cabin camera(s) 541, which may be any type of camera described herein, and which may be placed anywhere on or in vehicle 500 that provides a view of the cabin or interior thereof. For example, cabin camera(s) 541 may be placed within or on some portion of the vehicle 500 dashboard, rear view mirror, side view mirrors, seats, or doors and oriented to capture images of any drivers, passengers, or any other object or portion of the vehicle 500.

Figure 5C:
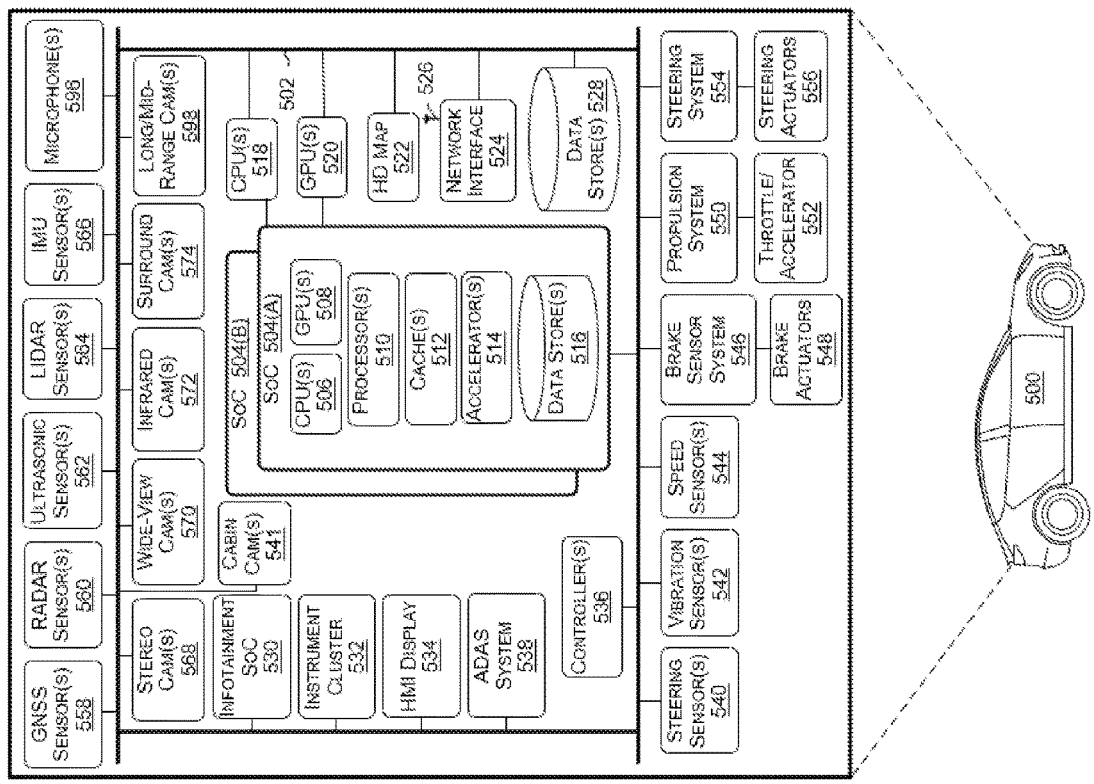
FIG. 5C is a block diagram of an example system architecture for the example autonomous vehicle of FIG. 5A, in accordance with some embodiments of the present disclosure.

FIG. 5C is a block diagram of an example system architecture for the example autonomous vehicle 500 of FIG. 5A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 500 in FIG. 5C is illustrated as being connected via bus 502. The bus 502 may include a Controller Area Network (CAN) data interface (alternatively referred to herein as a "CAN bus"). A CAN may be a network inside the vehicle 500 used to aid in control of various features and functionality of the vehicle 500, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 502 is described herein as being a CAN bus, this is not intended to be limiting. For example, in addition to, or alternatively from, the CAN bus, FlexRay and/or Ethernet may be used. Additionally, although a single line is used to represent the bus 502, this is not intended to be limiting. For example, there may be any number of busses 502, which may include one or more CAN busses, one or more FlexRay busses, one or more Ethernet busses, and/or one or more other types of busses using a different protocol. In some examples, two or more busses 502 may be used to perform different functions, and/or may be used for redundancy. For example, a first bus 502 may be used for collision avoidance functionality and a second bus 502 may be used for actuation control. In any example, each bus 502 may communicate with any of the components of the vehicle 500, and two or more busses 502 may communicate with the same components. In some examples, each SoC 504, each controller 536, and/or each computer within the vehicle may have access to the same input data (e.g., inputs from sensors of the vehicle 500), and may be connected to a common bus, such the CAN bus.

The vehicle 500 may include one or more controller(s) 536, such as those described herein with respect to FIG. 5A. The controller(s) 536 may be used for a variety of functions. The controller(s) 536 may be coupled to any of the various other components and systems of the vehicle 500 and may be used for control of the vehicle 500, artificial intelligence of the vehicle 500, infotainment for the vehicle 500, and/or the like.

The vehicle 500 may include a system(s) on a chip (SoC) 504. The SoC 504 may include CPU(s) 506, GPU(s) 508, processor(s) 510, cache(s) 512, accelerator(s) 514, data store(s) 516, and/or other components and features not illustrated. The SoC(s) 504 may be used to control the vehicle 500 in a variety of platforms and systems. For example, the SoC(s) 504 may be combined in a system (e.g., the system of the vehicle 500) with an HD map 522 which may obtain map refreshes and/or updates via a network interface 524 from one or more servers (e.g., server(s) 578 of FIG. 5D).

The CPU(s) 506 may include a CPU cluster or CPU complex (alternatively referred to herein as a "CCPLEX"). The CPU(s) 506 may include multiple cores and/or L2 caches. For example, in some embodiments, the CPU(s) 506 may include eight cores in a coherent multi-processor configuration. In some embodiments, the CPU(s) 506 may include four dual-core clusters where each cluster has a dedicated L2 cache (e.g., a 2 MB L2 cache). The CPU(s) 506 (e.g., the CCPLEX) may be configured to support simultaneous cluster operation enabling any combination of the clusters of the CPU(s) 506 to be active at any given time.

The CPU(s) 506 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 506 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 508 may include an integrated GPU (alternatively referred to herein as an "iGPU"). The GPU(s) 508 may be programmable and may be efficient for parallel workloads. The GPU(s) 508, in some examples, may use an enhanced tensor instruction set. The GPU(s) 508 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 508 may include at least eight streaming microprocessors. The GPU(s) 508 may use computer-based application programming interface(s) (API(s)). In addition, the GPU(s) 508 may use one or more parallel computing platforms and/or programming models (e.g., NVIDIA's CUDA).

The GPU(s) 508 may be power-optimized for best performance in automotive and embedded use cases. For example, the GPU(s) 508 may be fabricated on a Fin field-effect transistor (FinFET). However, this is not intended to be limiting, and the GPU(s) 508 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread-scheduling capability to enable finer-grain synchronization and cooperation between parallel threads. The streaming microprocessors may include a combined L1 data cache and shared memory unit in order to improve performance while simplifying programming.

The GPU(s) 508 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 508 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 508 to access the CPU(s) 506 page tables directly. In such examples, when the GPU(s) 508 memory management unit (MMU) experiences a miss, an address translation request may be transmitted to the CPU(s) 506. In response, the CPU(s) 506 may look in its page tables for the virtual-to-physical mapping for the address and transmits the translation back to the GPU(s) 508. As such, unified memory technology may allow a single unified virtual address space for memory of both the CPU(s) 506 and the GPU(s) 508, thereby simplifying the GPU(s) 508 programming and porting of applications to the GPU(s) 508.

In addition, the GPU(s) 508 may include an access counter that may keep track of the frequency of access of the GPU(s) 508 to memory of other processors. The access counter may help ensure that memory pages are moved to the physical memory of the processor that is accessing the pages most frequently.

The SoC(s) 504 may include any number of cache(s) 512, including those described herein. For example, the cache(s) 512 may include an L3 cache that is available to both the CPU(s) 506 and the GPU(s) 508 (e.g., that is connected to both the CPU(s) 506 and the GPU(s) 508). The cache(s) 512 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 504 may include an arithmetic logic unit(s) (ALU(s)) which may be leveraged in performing processing with respect to any of the variety of tasks or operations of the vehicle 500—such as processing DNNs. In addition, the SoC(s) 504 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 506 and/or GPU(s) 508.

The SoC(s) 504 may include one or more accelerators 514 (e.g., hardware accelerators, software accelerators, or a combination thereof). For example, the SoC(s) 504 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 508 and to off-load some of the tasks of the GPU(s) 508 (e.g., to free up more cycles of the GPU(s) 508 for performing other tasks). As an example, the accelerator(s) 514 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 514 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 508, and by using an inference accelerator, for example, a designer may target either the DLA(s) or the GPU(s) 508 for any function. For example, the designer may focus processing of CNNs and floating point operations on the DLA(s) and leave other functions to the GPU(s) 508 and/or other accelerator(s) 514.

The accelerator(s) 514 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 506. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 514 (e.g., the hardware acceleration cluster) may include a computer vision network on-chip and SRAM, for providing a high-bandwidth, low latency SRAM for the accelerator(s) 514. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 504 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 514 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. For example, the PVA may be used to process raw RADAR data (e.g., using a 4D Fast Fourier Transform) to provide a processed RADAR signal before emitting the next RADAR pulse. In other examples, the PVA is used for time of flight depth processing, by processing raw time of flight data to provide processed time of flight data, for example.

The DLA may be used to run any type of network to enhance control and driving safety, including, for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 566 output that correlates with the vehicle 500 orientation, distance, 3D location estimates of the object obtained from the neural network and/or other sensors (e.g., LIDAR sensor(s) 564 or RADAR sensor(s) 560), among others.

The SoC(s) 504 may include data store(s) 516 (e.g., memory). The data store(s) 516 may be on-chip memory of the SoC(s) 504, which may store neural networks to be executed on the GPU and/or the DLA. In some examples, the data store(s) 516 may be large enough in capacity to store multiple instances of neural networks for redundancy and safety. The data store(s) 516 may comprise L2 or L3 cache(s) 512. Reference to the data store(s) 516 may include reference to the memory associated with the PVA, DLA, and/or other accelerator(s) 514, as described herein.

The SoC(s) 504 may include one or more processor(s) 510 (e.g., embedded processors). The processor(s) 510 may include a boot and power management processor that may be a dedicated processor and subsystem to handle boot power and management functions and related security enforcement. The boot and power management processor may be a part of the SoC(s) 504 boot sequence and may provide runtime power management services. The boot power and management processor may provide clock and voltage programming, assistance in system low power state transitions, management of SoC(s) 504 thermals and temperature sensors, and/or management of the SoC(s) 504 power states. Each temperature sensor may be implemented as a ring-oscillator whose output frequency is proportional to temperature, and the SoC(s) 504 may use the ring-oscillators to detect temperatures of the CPU(s) 506, GPU(s) 508, and/or accelerator(s) 514. If temperatures are determined to exceed a threshold, the boot and power management processor may enter a temperature fault routine and put the SoC(s) 504 into a lower power state and/or put the vehicle 500 into a chauffeur to safe-stop mode (e.g., bring the vehicle 500 to a safe stop).

The processor(s) 510 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 510 may further include an always-on processor engine that may provide necessary hardware features to support low power sensor management and wake use cases. The always-on processor engine may include a processor core, a tightly coupled RAM, supporting peripherals (e.g., timers and interrupt controllers), various I/O controller peripherals, and routing logic.

The processor(s) 510 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 510 may further include a real-time camera engine that may include a dedicated processor subsystem for handling real-time camera management.

The processor(s) 510 may further include a high-dynamic range signal processor that may include an image signal processor that is a hardware engine that is part of the camera processing pipeline.

The processor(s) 510 may include a video image compositor that may be a processing block (e.g., implemented on a microprocessor) that implements video post-processing functions needed by a video playback application to produce the final image for the player window. The video image compositor may perform lens distortion correction on wide-view camera(s) 570, surround camera(s) 574, and/or on in-cabin monitoring camera sensors. An in-cabin monitoring camera sensor is preferably monitored by a neural network running on another instance of the advanced SoC, configured to identify in-cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 508 is not required to continuously render new surfaces. Even when the GPU(s) 508 is powered on and actively performing 3D rendering, the video image compositor may be used to offload the GPU(s) 508 to improve performance and responsiveness.

The SoC(s) 504 may further include a mobile industry processor interface (MIPI) camera serial interface for receiving video and input from cameras, a high-speed interface, and/or a video input block that may be used for camera and related pixel input functions. The SoC(s) 504 may further include an input/output controller(s) that may be controlled by software and may be used for receiving I/O signals that are uncommitted to a specific role.

The SoC(s) 504 may further include a broad range of peripheral interfaces to enable communication with peripherals, audio codecs, power management, and/or other devices. The SoC(s) 504 may be used to process data from cameras (e.g., connected over Gigabit Multimedia Serial Link and Ethernet), sensors (e.g., LIDAR sensor(s) 564, RADAR sensor(s) 560, etc. that may be connected over Ethernet), data from bus 502 (e.g., speed of vehicle 500, steering wheel position, etc.), data from GNSS sensor(s) 558 (e.g., connected over Ethernet or CAN bus). The SoC(s) 504 may further include dedicated high-performance mass storage controllers that may include their own DMA engines, and that may be used to free the CPU(s) 506 from routine data management tasks.

The SoC(s) 504 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 504 may be faster, more reliable, and even more energy-efficient and space-efficient than conventional systems. For example, the accelerator(s) 514, when combined with the CPU(s) 506, the GPU(s) 508, and the data store(s) 516, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 520) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path-planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path-planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 508.

In some examples, a CNN for facial recognition and vehicle owner identification may use data from camera sensors to identify the presence of an authorized driver and/or owner of the vehicle 500. The always-on sensor processing engine may be used to unlock the vehicle when the owner approaches the driver door and turn on the lights, and, in security mode, to disable the vehicle when the owner leaves the vehicle. In this way, the SoC(s) 504 provide for security against theft and/or carjacking.

In another example, a CNN for emergency vehicle detection and identification may use data from microphones 596 to detect and identify emergency vehicle sirens. In contrast to conventional systems, which use general classifiers to detect sirens and manually extract features, the SoC(s) 504 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 558. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 562, until the emergency vehicle(s) passes.

The vehicle may include a CPU(s) 518 (e.g., discrete CPU(s), or dCPU(s)), that may be coupled to the SoC(s) 504 via a high-speed interconnect (e.g., PCIe). The CPU(s) 518 may include an X86 processor, for example. The CPU(s) 518 may be used to perform any of a variety of functions, including arbitrating potentially inconsistent results between ADAS sensors and the SoC(s) 504, and/or monitoring the status and health of the controller(s) 536 and/or infotainment SoC 530, for example.

The vehicle 500 may include a GPU(s) 520 (e.g., discrete GPU(s), or dGPU(s)), that may be coupled to the SoC(s) 504 via a high-speed interconnect (e.g., NVIDIA's NVLINK). The GPU(s) 520 may provide additional artificial intelligence functionality, such as by executing redundant and/or different neural networks, and may be used to train and/or update neural networks based on input (e.g., sensor data) from sensors of the vehicle 500.

The vehicle 500 may further include the network interface 524 which may include one or more wireless antennas 526 (e.g., one or more wireless antennas for different communication protocols, such as a cellular antenna, a Bluetooth antenna, etc.). The network interface 524 may be used to enable wireless connectivity over the Internet with the cloud (e.g., with the server(s) 578 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 500 information about vehicles in proximity to the vehicle 500 (e.g., vehicles in front of, on the side of, and/or behind the vehicle 500). This functionality may be part of a cooperative adaptive cruise control functionality of the vehicle 500.

The network interface 524 may include an SoC that provides modulation and demodulation functionality and enables the controller(s) 536 to communicate over wireless networks. The network interface 524 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 500 may further include data store(s) 528, which may include off-chip (e.g., off the SoC(s) 504) storage. The data store(s) 528 may include one or more storage elements including RAM, SRAM, DRAM, VRAM, Flash, hard disks, and/or other components and/or devices that may store at least one bit of data.

The vehicle 500 may further include GNSS sensor(s) 558 (e.g., GPS and/or assisted GPS sensors), to assist in mapping, perception, occupancy grid generation, and/or path planning functions. Any number of GNSS sensor(s) 558 may be used, including, for example and without limitation, a GPS using a USB connector with an Ethernet to serial (RS-232) bridge.

The vehicle 500 may further include RADAR sensor(s) 560. The RADAR sensor(s) 560 may be used by the vehicle 500 for long-range vehicle detection, even in darkness and/or severe weather conditions. RADAR functional safety levels may be ASIL B. The RADAR sensor(s) 560 may use the CAN and/or the bus 502 (e.g., to transmit data generated by the RADAR sensor(s) 560) for control and to access object tracking data, with access to Ethernet to access raw data, in some examples. A wide variety of RADAR sensor types may be used. For example, and without limitation, the RADAR sensor(s) 560 may be suitable for front, rear, and side RADAR use. In some example, Pulse Doppler RADAR sensor(s) are used.

The RADAR sensor(s) 560 may include different configurations, such as long-range with narrow field of view, short-range with wide field of view, short-range side coverage, etc. In some examples, long-range RADAR may be used for adaptive cruise control functionality. The long-range RADAR systems may provide a broad field of view realized by two or more independent scans, such as within a 250 m range. The RADAR sensor(s) 560 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the surrounding of the vehicle 500 surroundings at higher speeds with minimal interference from traffic in adjacent lanes. The other two antennae may expand the field of view, making it possible to quickly detect vehicles entering or leaving the vehicle's 500 lane.

Mid-range RADAR systems may include, as an example, a range of up to 560 m (front) or 80 m (rear), and a field of view of up to 42 degrees (front) or 550 degrees (rear). Short-range RADAR systems may include, without limitation, RADAR sensors designed to be installed at both ends of the rear bumper. When installed at both ends of the rear bumper, such a RADAR sensor system may create two beams that constantly monitor the blind spot in the rear and next to the vehicle.

Short-range RADAR systems may be used in an ADAS system for blind spot detection and/or lane change assist.

The vehicle 500 may further include ultrasonic sensor(s) 562. The ultrasonic sensor(s) 562, which may be positioned at the front, back, and/or the sides of the vehicle 500, may be used for park assist and/or to create and update an occupancy grid. A wide variety of ultrasonic sensor(s) 562 may be used, and different ultrasonic sensor(s) 562 may be used for different ranges of detection (e.g., 2.5 m, 4 m). The ultrasonic sensor(s) 562 may operate at functional safety levels of ASIL B.

The vehicle 500 may include LIDAR sensor(s) 564. The LIDAR sensor(s) 564 may be used for object and pedestrian detection, emergency braking, collision avoidance, and/or other functions. The LIDAR sensor(s) 564 may be functional safety level ASIL B. In some examples, the vehicle 500 may include multiple LIDAR sensors 564 (e.g., two, four, six, etc.) that may use Ethernet (e.g., to provide data to a Gigabit Ethernet switch).

In some examples, the LIDAR sensor(s) 564 may be capable of providing a list of objects and their distances for a 360-degree field of view. Commercially available LIDAR sensor(s) 564 may have an advertised range of approximately 100 m, with an accuracy of 2 cm-3 cm, and with support for a 100 Mbps Ethernet connection, for example. In some examples, one or more non-protruding LIDAR sensors 564 may be used. In such examples, the LIDAR sensor(s) 564 may be implemented as a small device that may be embedded into the front, rear, sides, and/or corners of the vehicle 500. The LIDAR sensor(s) 564, in such examples, may provide up to a 120-degree horizontal and 35-degree vertical field-of-view, with a 200 m range even for low-reflectivity objects. Front-mounted LIDAR sensor(s) 564 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 500. Available 3D flash LIDAR systems include a solid-state 3D staring array LIDAR camera with no moving parts other than a fan (e.g., a non-scanning LIDAR device). The flash LIDAR device may use a five nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 564 may be less susceptible to motion blur, vibration, and/or shock.

The vehicle may further include IMU sensor(s) 566. The IMU sensor(s) 566 may be located at a center of the rear axle of the vehicle 500, in some examples. The IMU sensor(s) 566 may include, for example and without limitation, an accelerometer(s), a magnetometer(s), a gyroscope(s), a magnetic compass(es), and/or other sensor types. In some examples, such as in six-axis applications, the IMU sensor(s) 566 may include accelerometers and gyroscopes, while in nine-axis applications, the IMU sensor(s) 566 may include accelerometers, gyroscopes, and magnetometers.

In some embodiments, the IMU sensor(s) 566 may be implemented as a miniature, high-performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 566 may enable the vehicle 500 to estimate heading without requiring input from a magnetic sensor by directly observing and correlating the changes in velocity from GPS to the IMU sensor(s) 566. In some examples, the IMU sensor(s) 566 and the GNSS sensor(s) 558 may be combined in a single integrated unit.

The vehicle may include microphone(s) 596 placed in and/or around the vehicle 500. The microphone(s) 596 may be used for emergency vehicle detection and identification, among other things.

The vehicle may further include any number of camera types, including stereo camera(s) 568, wide-view camera(s) 570, infrared camera(s) 572, surround camera(s) 574, long-range and/or mid-range camera(s) 598, and/or other camera types. The cameras may be used to capture image data around an entire periphery of the vehicle 500. The types of cameras used depends on the embodiments and requirements for the vehicle 500, and any combination of camera types may be used to provide the necessary coverage around the vehicle 500. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 5A and FIG. 5B.

The vehicle 500 may further include vibration sensor(s) 542. The vibration sensor(s) 542 may measure vibrations of components of the vehicle, such as the axle(s). For example, changes in vibrations may indicate a change in road surfaces. In another example, when two or more vibration sensors 542 are used, the differences between the vibrations may be used to determine friction or slippage of the road surface (e.g., when the difference in vibration is between a power-driven axle and a freely rotating axle).

The vehicle 500 may include an ADAS system 538. The ADAS system 538 may include an SoC, in some examples. The ADAS system 538 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 560, LIDAR sensor(s) 564, and/or a camera(s). The ACC systems may include longitudinal ACC and/or lateral ACC. Longitudinal ACC monitors and controls the distance to the vehicle immediately ahead of the vehicle 500 and automatically adjusts the vehicle speed to maintain a safe distance from vehicles ahead. Lateral ACC performs distance keeping and advises the vehicle 500 to change lanes when necessary. Lateral ACC is related to other ADAS applications such as LC and CWS.

CACC uses information from other vehicles that may be received via the network interface 524 and/or the wireless antenna(s) 526 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication links. In general, the V2V communication concept provides information about the immediately preceding vehicles (e.g., vehicles immediately ahead of and in the same lane as the vehicle 500), while the I2V communication concept provides information about traffic farther ahead. CACC systems may include either or both I2V and V2V information sources. Given the information of the vehicles ahead of the vehicle 500, CACC may be more reliable, and it has potential to improve traffic flow smoothness and reduce congestion on the road.

FCW systems are designed to alert the driver to a hazard, so that the driver may take corrective action. FCW systems use a front-facing camera and/or RADAR sensor(s) 560, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object and may automatically apply the brakes if the driver does not take corrective action within a specified time or distance parameter. AEB systems may use front-facing camera(s) and/or RADAR sensor(s) 560, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 500 crosses lane markings. An LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 500 if the vehicle 500 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 560, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 500 is backing up. Some RCTW systems include AEB to ensure that the vehicle brakes are applied to avoid a crash. RCTW systems may use one or more rear-facing RADAR sensor(s) 560, coupled to a dedicated processor, DSP, FPGA, and/or ASIC, that is electrically coupled to driver feedback, such as a display, speaker, and/or vibrating component.

Conventional ADAS systems may be prone to false positive results, which may be annoying and distracting to a driver, but typically are not catastrophic, because the ADAS systems alert the driver and allow the driver to decide whether a safety condition truly exists and act accordingly. However, in an autonomous vehicle 500, the vehicle 500 itself must, in the case of conflicting results, decide whether to heed the result from a primary computer or a secondary computer (e.g., a first controller 536 or a second controller 536). For example, in some embodiments, the ADAS system 538 may be a backup and/or secondary computer for providing perception information to a backup computer rationality module. The backup computer rationality monitor may run a redundant diverse software on hardware components to detect faults in perception and dynamic driving tasks. Outputs from the ADAS system 538 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output can be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 504.

In other examples, ADAS system 538 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity make the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on used by the primary computer is not causing material error.

In some examples, the output of the ADAS system 538 may be fed into the primary computer's perception block and/or the primary computer's dynamic driving task block. For example, if the ADAS system 538 indicates a forward crash warning due to an object immediately ahead, the perception block may use this information when identifying objects. In other examples, the secondary computer may have its own neural network that is trained and thus reduces the risk of false positives, as described herein.

The vehicle 500 may further include the infotainment SoC 530 (e.g., an in-vehicle infotainment system (IVI)). Although illustrated and described as an SoC, the infotainment system may not be a SoC, and may include two or more discrete components. The infotainment SoC 530 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle-related information such as fuel level, total distance covered, brake fuel level, oil level, door open/close, air filter information, etc.) to the vehicle 500. For example, the infotainment SoC 530 may include radios, disk players, navigation systems, video players, USB and Bluetooth connectivity, carputers, in-car entertainment, Wi-Fi, steering wheel audio controls, hands-free voice control, a heads-up display (HUD), an HMI display 534, a telematics device, a control panel (e.g., for controlling and/or interacting with various components, features, and/or systems), and/or other components. The infotainment SoC 530 may further be used to provide information (e.g., visual and/or audible) to a user(s) of the vehicle, such as information from the ADAS system 538, autonomous driving information such as planned vehicle maneuvers, trajectories, surrounding environment information (e.g., intersection information, vehicle information, road information, etc.), and/or other information.

The infotainment SoC 530 may include GPU functionality. The infotainment SoC 530 may communicate over the bus 502 (e.g., CAN bus, Ethernet, etc.) with other devices, systems, and/or components of the vehicle 500. In some examples, the infotainment SoC 530 may be coupled to a supervisory MCU such that the GPU of the infotainment system may perform some self-driving functions in the event that the primary controller(s) 536 (e.g., the primary and/or backup computers of the vehicle 500) fail. In such an example, the infotainment SoC 530 may put the vehicle 500 into a chauffeur to safe-stop mode, as described herein.

The vehicle 500 may further include an instrument cluster 532 (e.g., a digital dash, an electronic instrument cluster, a digital instrument panel, etc.). The instrument cluster 532 may include a controller and/or supercomputer (e.g., a discrete controller or supercomputer). The instrument cluster 532 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 530 and the instrument cluster 532. In other words, the instrument cluster 532 may be included as part of the infotainment SoC 530, or vice versa.

Figure 5D:
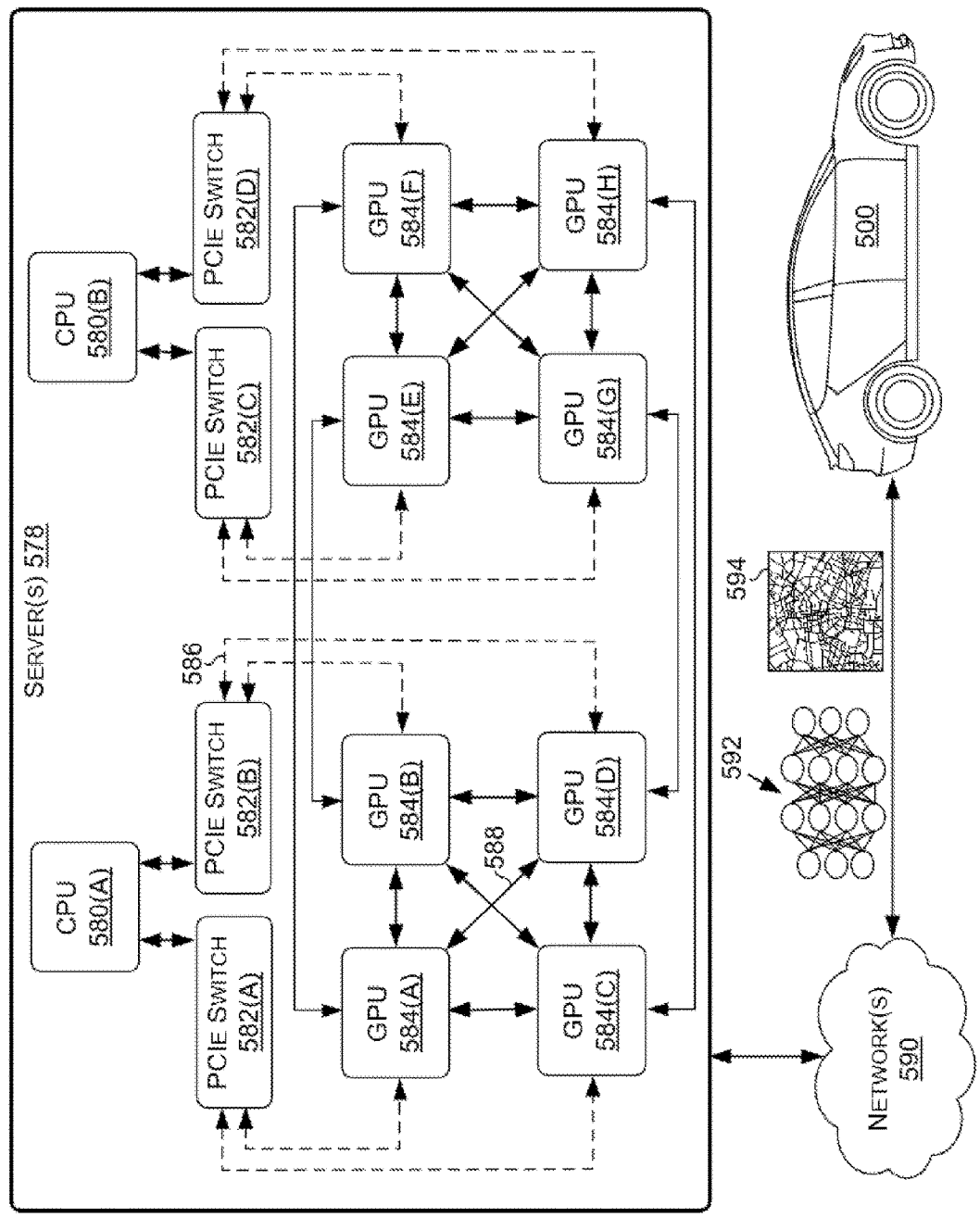
FIG. 5D is a system diagram for communication between cloud-based server(s) and the example autonomous vehicle of FIG. 5A, in accordance with some embodiments of the present disclosure.

FIG. 5D is a system diagram for communication between cloud-based server(s) and the example autonomous vehicle 500 of FIG. 5A, in accordance with some embodiments of the present disclosure. The system 576 may include server(s) 578, network(s) 590, and vehicles, including the vehicle 500. The server(s) 578 may include a plurality of GPUs 584(A)-584(H) (collectively referred to herein as GPUs 584), PCIe switches 582(A)-582(H) (collectively referred to herein as PCIe switches 582), and/or CPUs 580(A)-580(B) (collectively referred to herein as CPUs 580). The GPUs 584, the CPUs 580, and the PCIe switches may be interconnected with high-speed interconnects such as, for example and without limitation, NVLink interfaces 588 developed by NVIDIA and/or PCIe connections 586. In some examples, the GPUs 584 are connected via NVLink and/or NVSwitch SoC and the GPUs 584 and the PCIe switches 582 are connected via PCIe interconnects. Although eight GPUs 584, two CPUs 580, and two PCIe switches are illustrated, this is not intended to be limiting. Depending on the embodiment, each of the server(s) 578 may include any number of GPUs 584, CPUs 580, and/or PCIe switches. For example, the server(s) 578 may each include eight, sixteen, thirty-two, and/or more GPUs 584.

The server(s) 578 may receive, over the network(s) 590 and from the vehicles, image data representative of images showing unexpected or changed road conditions, such as recently commenced roadwork. The server(s) 578 may transmit, over the network(s) 590 and to the vehicles, neural networks 592, updated neural networks 592, and/or map information 594, including information regarding traffic and road conditions. The updates to the map information 594 may include updates for the HD map 522, such as information regarding construction sites, potholes, detours, flooding, and/or other obstructions. In some examples, the neural networks 592, the updated neural networks 592, and/or the map information 594 may have resulted from new training and/or experiences represented in data received from any number of vehicles in the environment, and/or based on training performed at a datacenter (e.g., using the server(s) 578 and/or other servers).

The server(s) 578 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 590, and/or the machine learning models may be used by the server(s) 578 to remotely monitor the vehicles.

In some examples, the server(s) 578 may receive data from the vehicles and apply the data to up-to-date real-time neural networks for real-time intelligent inferencing. The server(s) 578 may include deep-learning supercomputers and/or dedicated AI computers powered by GPU(s) 584, such as a DGX and DGX Station machines developed by NVIDIA. However, in some examples, the server(s) 578 may include deep learning infrastructure that use only CPU-powered datacenters.

The deep-learning infrastructure of the server(s) 578 may be capable of fast, real-time inferencing, and may use that capability to evaluate and verify the health of the processors, software, and/or associated hardware in the vehicle 500. For example, the deep-learning infrastructure may receive periodic updates from the vehicle 500, such as a sequence of images and/or objects that the vehicle 500 has located in that sequence of images (e.g., via computer vision and/or other machine learning object classification techniques). The deep-learning infrastructure may run its own neural network to identify the objects and compare them with the objects identified by the vehicle 500 and, if the results do not match and the infrastructure concludes that the AI in the vehicle 500 is malfunctioning, the server(s) 578 may transmit a signal to the vehicle 500 instructing a fail-safe computer of the vehicle 500 to assume control, notify the passengers, and complete a safe parking maneuver.

For inferencing, the server(s) 578 may include the GPU(s) 584 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

FIG. 6 is a block diagram of an example computing device(s) 600 suitable for use in implementing some embodiments of the present disclosure. Computing device 600 may include an interconnect system 602 that directly or indirectly couples the following devices: memory 604, one or more central processing units (CPUs) 606, one or more graphics processing units (GPUs) 608, a communication interface 610, I/O ports 612, input/output components 614, a power supply 616, one or more presentation components 618 (e.g., display(s)), and one or more logic units 620.

Although the various blocks of FIG. 6 are shown as connected via the interconnect system 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "hand-held device," "game console," "electronic control unit (ECU)," "virtual reality system," "augmented reality system," and/or other device or system types, as all are contemplated within the scope of the computing device of FIG. 6.

The interconnect system 602 may represent one or more links or busses, such as an address bus, a data bus, a control bus, or a combination thereof. The interconnect system 602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 606 may be directly connected to the memory 604. Further, the CPU 606 may be directly connected to the GPU 608. Where there is direct, or point-to-point, connection between components, the interconnect system 602 may include a PCIe link to carry out the connection. In these examples, a PCI bus need not be included in the computing device 600.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computing device 600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 606 may be configured to execute at least some of the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an Advanced RISC Machines (ARM) processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

In addition to or alternatively from the CPU(s) 606, the GPU(s) 608 may be configured to execute at least some of the computer-readable instructions to control one or more components of the computing device 600 to perform one or more of the methods and/or processes described herein. One or more of the GPU(s) 608 may be an integrated GPU (e.g., with one or more of the CPU(s) 606 and/or one or more of the GPU(s) 608 may be a discrete GPU. In embodiments, one or more of the GPU(s) 608 may be a coprocessor of one or more of the CPU(s) 606. The GPU(s) 608 may be used by the computing device 600 to render graphics (e.g., 3D graphics) or perform general purpose computations. For example, the GPU(s) 608 may be used for General-Purpose computing on GPUs (GPGPU). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data or any other suitable data, such as GPGPU data. The display memory may be included as part of the memory 604. The GPU(s) 608 may include two or more GPUs operating in parallel (e.g., via a link). The link may directly connect the GPUs (e.g., using NVLINK) or may connect the GPUs through a switch (e.g., using NVSwitch). When combined together, each GPU 608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 606 and/or the GPU(s) 608, the logic unit(s) 620 may be configured to execute at least some of the computer-readable instructions to control one or more components of the computing device 600 to perform one or more of the methods and/or processes described herein. In embodiments, the CPU(s) 606, the GPU(s) 608, and/or the logic unit(s) 620 may discretely or jointly perform any combination of the methods, processes and/or portions thereof. One or more of the logic units 620 may be part of and/or integrated in one or more of the CPU(s) 606 and/or the GPU(s) 608 and/or one or more of the logic units 620 may be discrete components or otherwise external to the CPU(s) 606 and/or the GPU(s) 608. In embodiments, one or more of the logic units 620 may be a coprocessor of one or more of the CPU(s) 606 and/or one or more of the GPU(s) 608.

Examples of the logic unit(s) 620 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 610 may include one or more receivers, transmitters, and/or transceivers that enable the computing device 600 to communicate with other computing devices via an electronic communication network, including wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 612 may enable the computing device 600 to be logically coupled to other devices including the I/O components 614, the presentation component(s) 618, and/or other components, some of which may be built into (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to codes that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Figure 7:
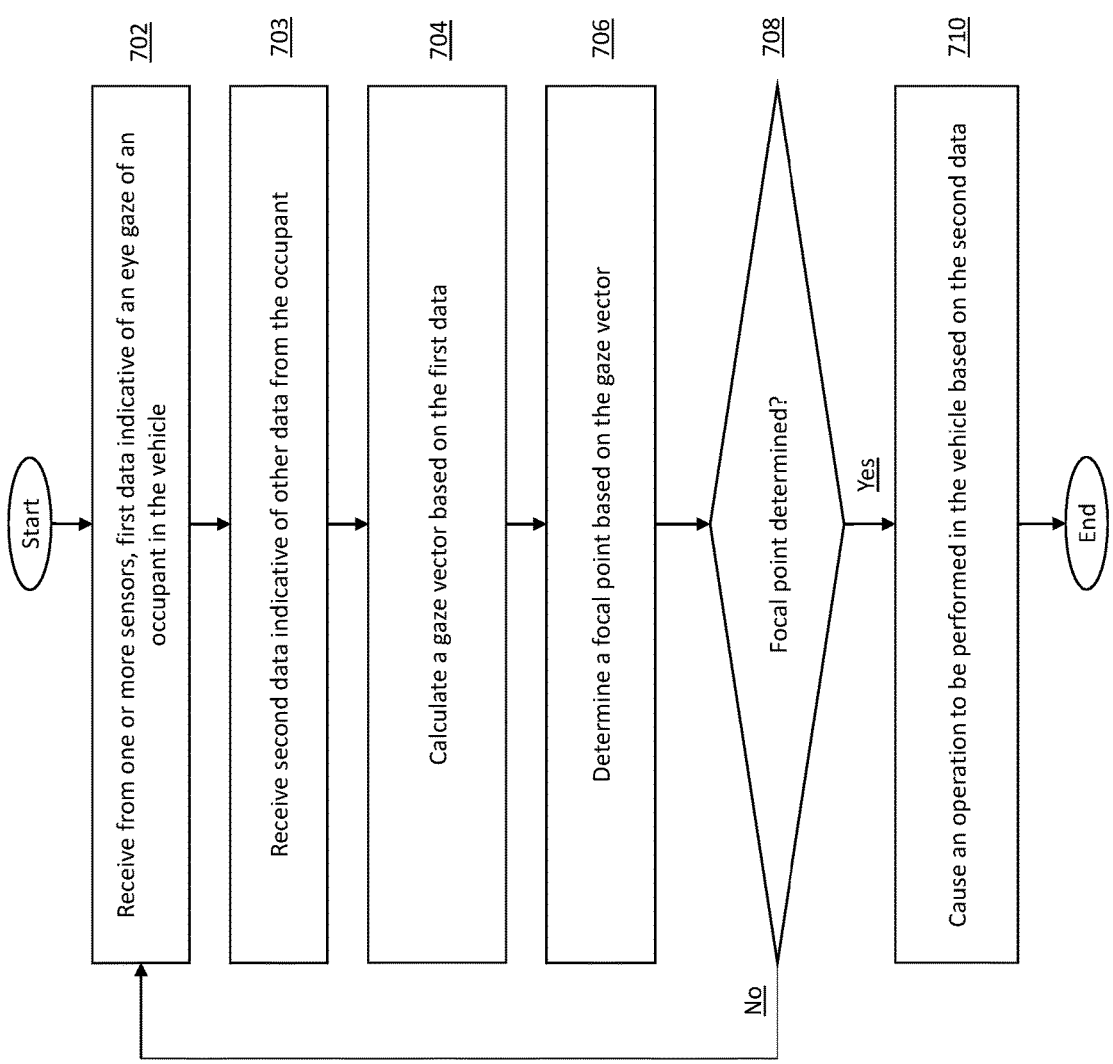
FIG. 7 is an example of an illustrative flowchart of causing an operation to be performed in the vehicle, in accordance with some embodiments of the present disclosure.
Figure 8:
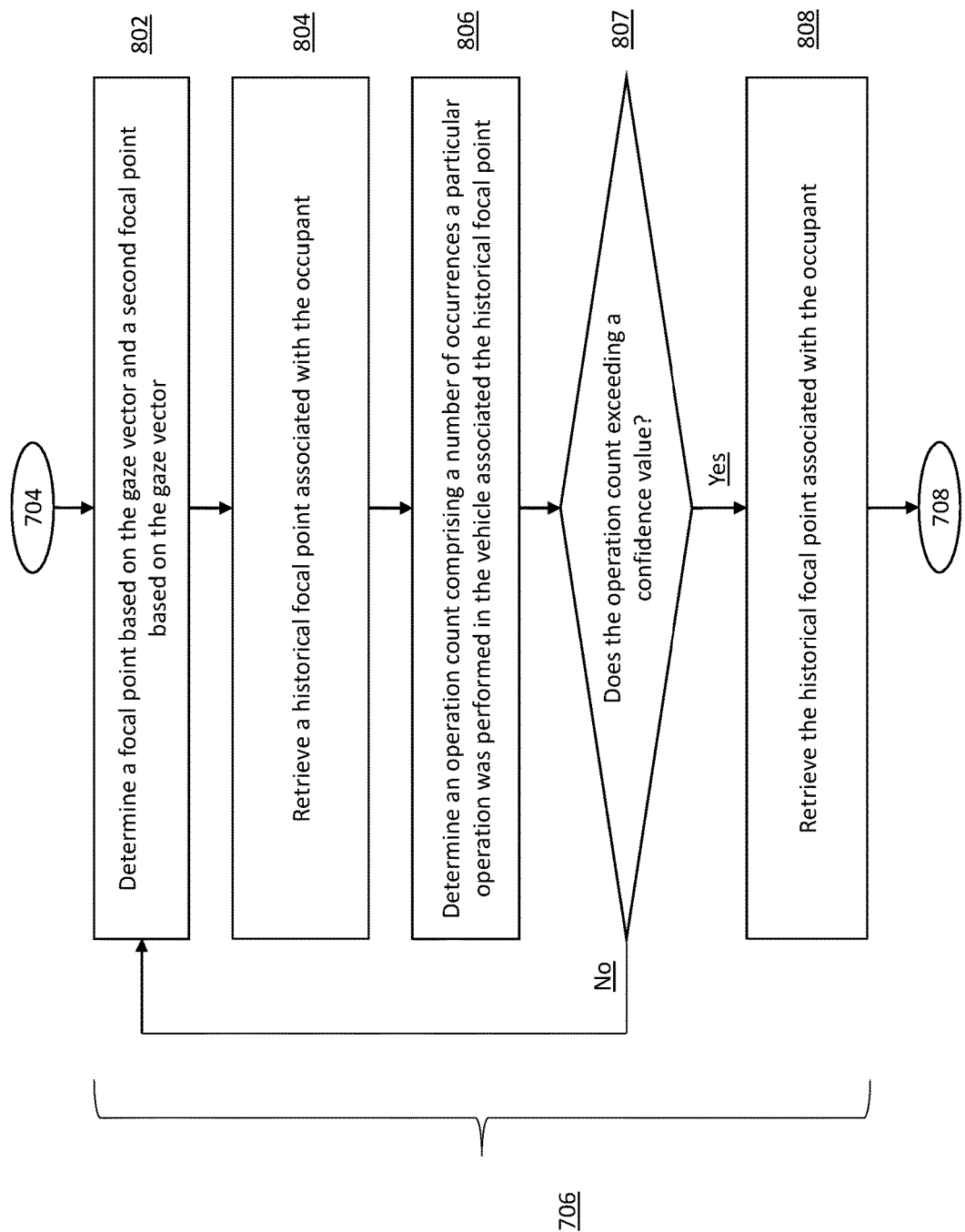
FIG. 8 is an example of an illustrative flowchart of retrieving a historical focal point associated with the occupant, in accordance with some embodiments of the present disclosure.
Figure 9:
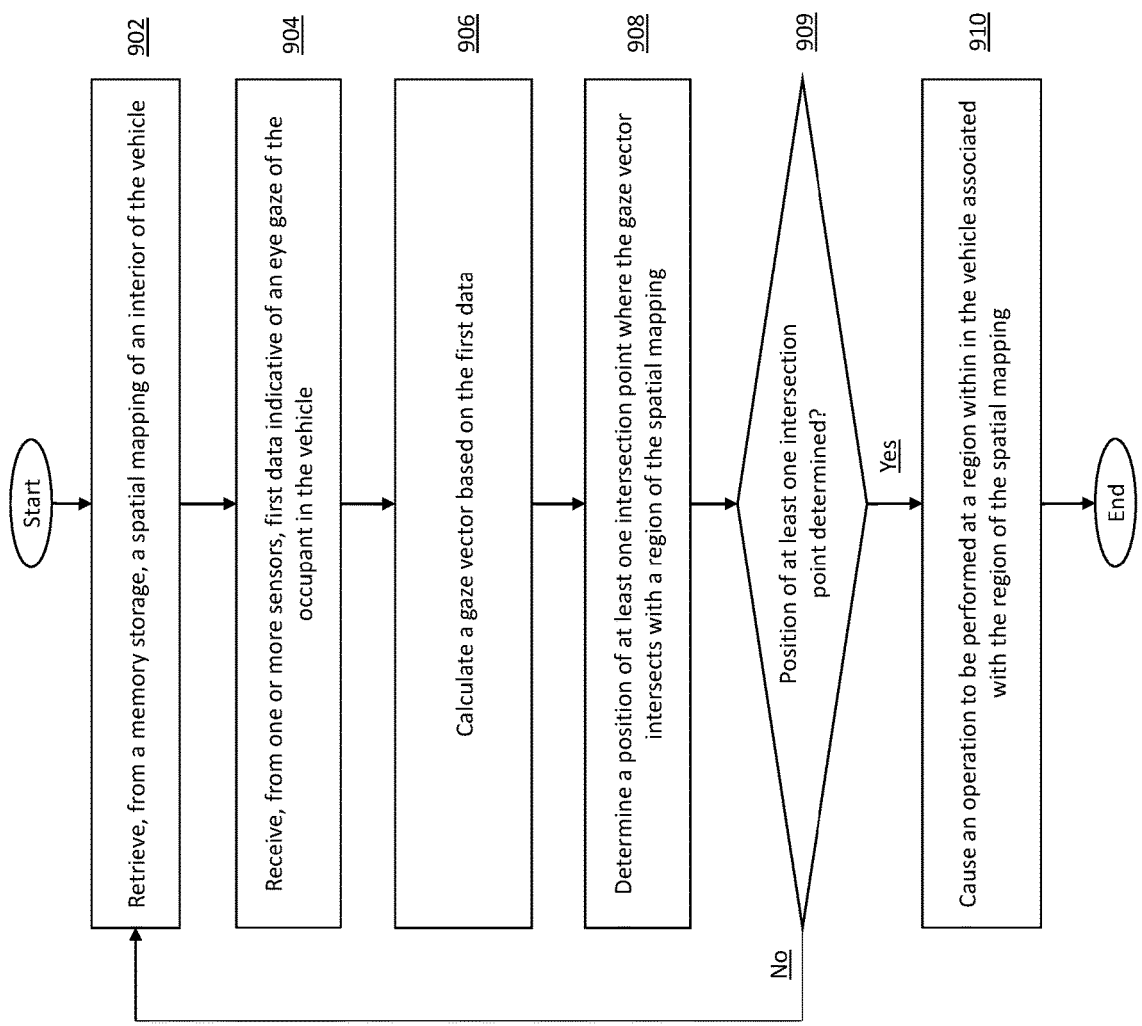
FIG. 9 is an example of an illustrative flowchart of causing an operation to be performed at a region within in the vehicle associated with a region of spatial mapping, in accordance with some embodiments of the present disclosure.

FIG. 7 is a flowchart illustrating process 700 for causing an operation to be performed in a vehicle, in accordance with embodiments of the disclosure. Each block of FIG. 7-9, described herein, comprises a computing process that may be performed using any combination of hardware, firmware, and/or software. For instance, various functions may be carried out by a processor executing instructions stored in memory. The methods/flowcharts may also be embodied as computer-usable instructions stored on computer storage media. The methods may be provided by a standalone application, a service or hosted service (standalone or in combination with another hosted service), or a plug-in to another product, to name a few. In addition, methods of FIGS. 7-9 are described, by way of example, with respect to the example autonomous vehicle of FIGS. 5A-D. However, these methods may additionally or alternatively be executed by any one system, or any combination of systems, including, but not limited to, those described herein.

At 702, the processing circuitry receives, from one or more sensors, first data indicative of an eye gaze of an occupant in the vehicle. In some embodiments, the processing circuitry receives data indicative of an eye gaze of an occupant in the vehicle from stereo camera(s) 568, wide-view camera(s) 570 (e.g., fisheye cameras), infrared camera(s) 572, surround camera(s) 574 (e.g., 360 degree cameras), long-range cameras (not shown in FIG. 5A), mid-range camera(s) (not shown in FIG. 5A), vehicle interior cameras (not shown in FIG. 5A) and/or other sensor types.

At 703, the processing circuitry receives, from one or more sensors, second data indicative of other data from the occupant. In some embodiments, the processing circuitry receives the second data from, at least in part, global navigation satellite systems ("GNSS") sensor(s) 558 (e.g., Global Positioning System sensor(s)), RADAR sensor(s) 560; ultrasonic sensor(s) 562; LIDAR sensor(s) 564; inertial measurement unit ("IMU") sensor(s) 566 (e.g., accelerometer(s), gyroscope(s), magnetic compass(es), magnetometer(s), etc.); microphone(s) 596; stereo camera(s) 568; wide-view camera(s) 570 (e.g., fisheye cameras); infrared camera(s) 572; surround camera(s) 574 (e.g., 360 degree cameras); long-range cameras (not shown in FIG. mid-range camera(s) (not shown in FIG. 5A); speed sensor(s) 544 (e.g., for measuring speed of vehicle 500); vibration sensor(s) 542; steering sensor(s) 540; brake sensor(s) (e.g., as part of brake sensor system 546); and/or other sensor types. In some embodiments, the processing circuitry receives second data indicative of a depiction of the interior of the vehicle from one or more camera sensors mentioned above.

At 704, the processing circuitry calculates, using parallel processing circuitry that implements a machine learning model, a gaze vector based on the first data (e.g., first data indicative of the eye gaze of the occupant). In some embodiments, the machine learning model may implement training an untrained neural network with training data. The gaze vector (e.g., result), is determined by the trained neural network 608 receiving the input of the first data (e.g., new data). In some embodiments, the processing circuitry calculates the gaze vector by implementing a hardware accelerator to use the neural networks 592. For example, the hardware accelerator may be one or more modules from the hardware acceleration cluster. The modules from the hardware acceleration cluster include one or more DLA(s), one or more PVA(s), and/or one or more TPU(s). In some embodiments, the hardware acceleration cluster is part of the server 578. In this embodiment, data is exchanged between the processing circuitry of the vehicle and the server. In other embodiments, processing circuitry includes the processing circuitry of the server. In still other embodiments, the hardware cluster is part of SoC 504.

At 706, the processing circuitry determines, using parallel processing circuitry, a focal point based on the gaze vector. At 708, the processing circuitry determines whether a focal point has been determined based on the gaze vector. If, at 708, the processing circuitry determines a focal point has not been determined based on the gaze vector ("No"), the process reverts to step 702. If, at 708, the processing circuitry determines a focal point has been determined based on the gaze vector ("Yes"), the process advances to step 710. At 708, in response to determining the focal point based on the gaze vector, the processing circuitry, at 710, causes, using parallel processing circuitry, an operation to be performed in the vehicle based on the second data. In some embodiments, the processing circuitry provides an instruction to a sensor of the vehicle for the operation to be performed. Specifically, the processing circuitry provides the instruction to at least one of: global navigation satellite systems ("GNSS") sensor(s) 558 (e.g., Global Positioning System sensor(s)); RADAR sensor(s) 560; ultrasonic sensor(s) 562; LIDAR sensor(s) 564; inertial measurement unit ("IMU") sensor(s) 566 (e.g., accelerometer(s); gyro scope(s); magnetic compass(es); magnetometer(s), etc.); microphone(s) 596; stereo camera(s) 568; wide-view camera(s) 570 (e.g., fisheye cameras); infrared camera(s) 572; surround camera(s) 574 (e.g., 360 degree cameras); long-range cameras (not shown in FIG. 5A), mid-range camera(s) (not shown in FIG. 5A); speed sensor(s) 544 (e.g., for measuring speed of vehicle 500); vibration sensor(s) 542; steering sensor(s) 540; brake sensor(s) (e.g., as part of brake sensor system 546); and/or other sensor types.

FIG. 8 is an illustrative flowchart 800 of retrieving a historical focal point associated with the occupant, in accordance with some embodiments of the disclosure. At 802, the processing circuitry determines a first focal point based on the gaze vector and a second focal point based on the gaze vector. At 804, the processing circuitry retrieves a historical focal point associated with the occupant. In some embodiments, the historical focal point is retrieved from local memory (e.g., data stores 516, or similar memory stored locally within vehicle). In some embodiments, the processing circuitry may retrieve the historical focal point via the network 590 (e.g., server(s) 578, or a remote server storing the historical focal point).

At 806, the processing circuitry determines an operation count comprising an amount of times a particular operation was performed in the vehicle associated with the historical focal point. At 807, the processing circuitry determines whether the operation count exceeds a confidence value. In some embodiments, the processing circuitry retrieves the confidence value from local memory (e.g., data stores 516, or similar memory stored locally within vehicle). If, at 807, the processing circuitry determines the operation count does not exceed the confidence value ("No"), the process reverts to step 802. If, at 807, the processing circuitry determines the operation count exceeds the confidence value ("Yes"), the process advances to step 808. At 808, the processing circuitry retrieves the historical focal point associated with the occupant.

FIG. 9 is a flowchart illustrating process 900 for causing an operation to be performed in a vehicle, in accordance with embodiments of the disclosure. At 902, the processing circuitry retrieves, from a memory storage, a spatial mapping of an interior of the vehicle. In some embodiments, the processing circuitry may retrieve the spatial mapping from local memory (e.g., data stores 516, or similar memory stored locally within vehicle). In some embodiments, the processing circuitry may retrieve the spatial mapping from an external database via the network 590 (e.g., server(s) 578, or a remote server storing spatial mapping). In some embodiments, the processing circuitry may retrieve the spatial mapping from an external device via the network 590.

At 904, the processing circuitry receives, from one or more sensors, first data indicative of an eye gaze of the occupant in the vehicle. In some embodiments, the processing circuitry receives first data in the vehicle from stereo camera(s) 568, wide-view camera(s) 570 (e.g., fisheye cameras), infrared camera(s) 572, surround camera(s) 574 (e.g., 360 degree cameras), long-range cameras (not shown in FIG. 5A), mid-range camera(s) (not shown in FIG. 5A), vehicle interior cameras (not shown in FIG. 5A) and/or other sensor types.

At 906, the processing circuitry calculates, using parallel processing circuitry that implements a machine learning model, a gaze vector based on the first data (e.g., the first data indicative of the eye gaze of the occupant). In some embodiments, the machine learning model may implement training of an untrained neural network with training data. The gaze vector (e.g., result) is determined by the trained neural network receiving the input of the data indicative of the eye gaze of the occupant (e.g., new data). In some embodiments, the processing circuitry calculates the gaze vector by implementing a hardware accelerator to use the neural networks 592. For example, the hardware accelerator may be one or more modules from the hardware acceleration cluster. The modules from the hardware acceleration cluster include one or more DLA(s), one or more PVA(s), and/or one or more TPU(s). In some embodiments, the hardware acceleration cluster is part of the server 578. In this embodiment, data is exchanged between the processing circuitry of the vehicle and the server. In other embodiments, processing circuitry includes the processing circuitry of the server. In still other embodiments, the hardware cluster is part of SoC 504.

At 908, the processing circuitry determines, using parallel processing circuitry, a position of at least one intersection point where the gaze vector intersects with a region of the spatial mapping. At 909, the processing circuitry determines whether the position of at least one intersection point where the gaze vector intersects with a region of the spatial mapping has been determined. If, at 909, the processing circuitry determines the position of at least one intersection point where the gaze vector does not intersect with a region of the spatial mapping has not been determined ("No"), the process reverts to step 902. If, at 909, the processing circuitry determines the position of at least one intersection point where the gaze vector does not intersect with a region of the spatial mapping has been determined ("Yes"), the process advances to step 910.

At 910, the processing circuitry causes, using parallel processing circuitry, an operation to be performed at a region within the vehicle associated with the region of the spatial mapping. In some embodiments, the processing circuitry provides an instruction to a sensor of the vehicle for the operation to be performed. Specifically, the processing circuitry provides the instruction to at least one of global navigation satellite systems ("GNSS") sensor(s) 558 (e.g., Global Positioning System sensor(s)); RADAR sensor(s) 560; ultrasonic sensor(s) 562; LIDAR sensor(s) 564; inertial measurement unit ("IMU") sensor(s) 566 (e.g., accelerometer(s); gyroscope(s); magnetic compass(es); magnetometer(s), etc.); microphone(s) 596; stereo camera(s) 568; wide-view camera(s) 570 (e.g., fisheye cameras); infrared camera(s) 572; surround camera(s) 574 (e.g., 360 degree cameras); long-range cameras (not shown in FIG. 5A), mid-range camera(s) (not shown in FIG. 5A); speed sensor(s) 544 (e.g., for measuring speed of vehicle 500); vibration sensor(s) 542; steering sensor(s) 540; brake sensor(s) (e.g., as part of brake sensor system 546); and/or other sensor types.

It is contemplated that some suitable steps or suitable descriptions of FIGS. 7-9 may be used with other suitable embodiments of this disclosure. In addition, some suitable steps and descriptions described in relation to FIGS. 7-9 may be implemented in alternative orders or in parallel to further the purposes of this disclosure. For example, some suitable steps may be performed in any order or in parallel or substantially simultaneously to reduce lag or increase the speed of the system or method. Some suitable steps may also be skipped or omitted from the process. Furthermore, it should be noted that some suitable devices or equipment discussed in relation to FIGS. 5A-6 could be used to perform one or more of the steps in FIGS. 7-9.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
    identifying a region within a spatial mapping corresponding to an interior of a vehicle;
    calibrating the region of the spatial mapping to a gaze trigger associated with one or more operations corresponding to a location within the vehicle;
    activating the gaze trigger based at least on the calibrating;

computing, using one or more sensors of the vehicle, a gaze vector of an occupant of the vehicle;
determining a position of at least one intersection point where the gaze vector intersects with the region; and
based at least on the determining of the position of the at least one intersection point and the activating the gaze trigger, performing the one or more operations.

2. The method of claim 1, wherein the spatial mapping includes a three-dimensional (3D) mapping of the interior of the vehicle in a 3D coordinate space and the region includes a 3D region of the 3D coordinate space.

3. The method of claim 1, wherein the identifying comprises receiving, from the occupant of the vehicle, one or more selections identifying the region within the spatial mapping, and the calibrating the region of the spatial mapping is based at least on the one or more selections.

4. The method of claim 1, wherein the one or more selections are made by the occupant using a graphical user interface of the vehicle.

5. The method of claim 1, wherein the determining the position of at least one intersection point includes:
computing three-dimensional (3D) coordinates, in a 3D coordinate space, at which the gaze vector intersects at least one spatial coordinate of the spatial mapping; and
identifying, from a plurality of regions of the spatial mapping, the region corresponding to the at least one spatial coordinate,
wherein the performing of the one or more operations is based at least on the identifying the region corresponding to the at least one spatial coordinate.

6. The method of claim 1, further comprising determining an operation count indicating a number of instances that the one or more operations were performed in the vehicle in association with one or more historical focal points, wherein the performing of the one or more operations is based at least on the operation count exceeding a threshold value.

7. The method of claim 1, further comprising based at least on a period of time having elapsed after detecting a focal point at the region, performing one or more second operations corresponding to the region.

8. The method of claim 7, wherein the one or more second operations include switching circuitry associated with the region to a lower power mode.

9. The method of claim 1, wherein the region includes a three-dimensional (3D) space region, and the method is further comprising:
receiving user feedback on accuracy of the 3D space region; and
based at least on the user feedback, adjusting a granularity of the 3D space region in the spatial mapping.

10. A system comprising:
one or more processing units to perform operations including:
identifying a region within a spatial mapping corresponding to an interior of a vehicle;
calibrating the region of the spatial mapping to a gaze trigger associated with one or more operations corresponding to a location within the vehicle;
activating the gaze trigger based at least on the calibrating;
computing, using one or more sensors of the vehicle, a gaze vector of an occupant of the vehicle;
determining a position of at least one intersection point where the gaze vector intersects with the region; and
based at least on the determining of the position of the at least one intersection point and the activating the gaze trigger, performing the one or more operations.

11. The system of claim 10, wherein the spatial mapping includes a three-dimensional (3D) mapping of the interior of the vehicle in a 3D coordinate space and the region includes a 3D region of the 3D coordinate space.

12. The system of claim 10, wherein the identifying the region comprises receiving, from the occupant of the vehicle, one or more selections identifying the region within the spatial mapping and the calibrating the region is based at least on the one or more selections.

13. The system of claim 10, wherein the one or more selections are made by the occupant using a graphical user interface of the vehicle.

14. The system of claim 10, wherein the determining the position of at least one intersection point includes:
computing three-dimensional (3D) coordinates, in a 3D coordinate space, at which the gaze vector intersects at least one spatial coordinate of the spatial mapping; and
identifying, from a plurality of regions of the spatial mapping, the region corresponding to the at least one spatial coordinate,
wherein the performing of the one or more operations is based at least on identifying the region corresponding to the at least one spatial coordinate.

15. The system of claim 10, wherein the operations further include determining an operation count indicating a number of instances that the one or more operations were performed in the vehicle in association with one or more historical focal points, wherein the performing of the one or more operations is based at least on the operation count exceeding a threshold value.

16. At least one processor comprising:
one or more circuits to perform one or more operations corresponding to a location within in a vehicle and associated with a region of a spatial mapping of an interior of the vehicle based at least on:
identifying the region within the spatial mapping;
calibrating the region of the spatial mapping to a gaze trigger associated with the one or more operations;
activating the gaze trigger based at least on the calibrating;
computing, using one or more sensors of the vehicle, a gaze vector of an occupant of the vehicle; and
determining a position of at least one intersection point where the gaze vector intersects with the region of the spatial mapping.

17. The at least one processor of claim 16, wherein the spatial mapping includes a three-dimensional (3D) mapping of the interior of the vehicle in a 3D coordinate space and the region includes a 3D region of the 3D coordinate space.

18. The at least one processor of claim 16, wherein the identifying comprises receiving, from the occupant of the vehicle, one or more selections identifying the region within the spatial mapping and the calibrating the region is based on the one or more selections.

19. The at least one processor of claim 16, wherein the one or more selections are made by the occupant using a graphical user interface of the vehicle.

20. The at least one processor of claim 16, wherein the determining the position includes computing three-dimensional (3D) coordinates at which the gaze vector intersects a spatial coordinate of the spatial mapping that corresponds to the region, and the performing of the one or more operations is based at least on determining the spatial coordinate corresponds to the region.

* * * * *